(12) United States Patent
Liu et al.

(10) Patent No.: US 10,560,162 B2
(45) Date of Patent: Feb. 11, 2020

(54) TRANSMIT DIVERSITY METHOD, DEVICE, AND SYSTEM

(71) Applicant: Huawei Technologies Co., Ltd., Shenzhen, Guangdong (CN)

(72) Inventors: Kunpeng Liu, Beijing (CN); Qiang Wu, Beijing (CN); Leiming Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/125,276

(22) Filed: Sep. 7, 2018

(65) Prior Publication Data
US 2019/0020389 A1    Jan. 17, 2019

Related U.S. Application Data

(63) Continuation of application No. PCT/CN2016/076044, filed on Mar. 10, 2016.

(51) Int. Cl.
*H04B 7/06* (2006.01)
*H04B 7/0456* (2017.01)
(Continued)

(52) U.S. Cl.
CPC ......... *H04B 7/0486* (2013.01); *H04B 7/0417* (2013.01); *H04L 5/0026* (2013.01); *H04B 7/0626* (2013.01)

(58) Field of Classification Search
CPC ....... H04L 5/0026; H04L 1/0003–0044; H04L 1/0606; H04B 7/0486; H04B 7/0417; H04B 7/06; H04B 7/0626; H04B 7/068–0691
(Continued)

(56) References Cited

U.S. PATENT DOCUMENTS 7,042,956 B2 * 5/2006 El-Gamal ............. H04L 1/0059
375/267
7,944,985 B2 * 5/2011 ElGamal ............... H04L 1/0003
375/267
(Continued)

FOREIGN PATENT DOCUMENTS

CN       1773885 A       5/2006
CN       1969522 A       5/2007
(Continued)

OTHER PUBLICATIONS

Office Action issued in Chinese Application No. 201680083366.7 dated May 7, 2019, 16 pages (with English translation).
(Continued)

*Primary Examiner* — James M Perez
(74) *Attorney, Agent, or Firm* — Fish & Richardson P.C.

(57) ABSTRACT

A transmit diversity method, a device, and a system are described herein. The method includes: measuring, by a second network device, channel state information based on a pilot signal, and sending rank index information and precoding matrix index information to a first network device based on the channel state information; receiving, by the first network device, the rank index information and the precoding matrix index information that are sent by the second network device; determining a diversity coding scheme based on the rank index information; determining a precoding matrix based on the precoding matrix index information; and performing transmission processing on to-be-transmitted data based on the diversity coding scheme and the precoding matrix.

6 Claims, 6 Drawing Sheets

(51) Int. Cl.
*H04B 7/0417* (2017.01)
*H04L 5/00* (2006.01)

(58) Field of Classification Search
USPC .................................. 375/259–285, 295–296
See application file for complete search history.

(56) References Cited

U.S. PATENT DOCUMENTS

| | | | | |
|---|---|---|---|---|
| 7,953,169 B2* | 5/2011 | Lee | ...... | H04B 7/0678 375/260 |
| 8,144,797 B2* | 3/2012 | Mujtaba | ...... | H04B 7/0417 375/267 |
| 8,160,177 B2* | 4/2012 | Zhang | ...... | H04L 1/0606 375/299 |
| 8,213,873 B2* | 7/2012 | Bergljung | ...... | H04B 7/0417 370/252 |
| 8,311,150 B2* | 11/2012 | Lee | ...... | H04B 7/0671 375/299 |
| 8,325,844 B2* | 12/2012 | Walton | ...... | H04B 7/0417 375/130 |
| 8,345,732 B2* | 1/2013 | Fischer | ...... | H04B 7/0617 375/219 |
| 8,451,932 B2* | 5/2013 | Onggosanusi | ...... | H04B 7/0426 375/260 |
| 8,520,601 B2* | 8/2013 | Ko | ...... | H04B 7/0689 370/328 |
| 8,553,624 B2* | 10/2013 | Khan | ...... | H04B 7/0413 370/329 |
| 8,675,558 B2* | 3/2014 | Zhu | ...... | H04B 7/0689 370/328 |
| 8,675,794 B1* | 3/2014 | Perets | ...... | H04L 1/0003 375/225 |
| 8,787,485 B2* | 7/2014 | Liu | ...... | H04B 7/0486 375/267 |
| 8,792,932 B2* | 7/2014 | Wang | ...... | H04W 52/0206 455/522 |
| 8,811,518 B2* | 8/2014 | Li | ...... | H04B 7/0447 375/267 |
| 8,917,796 B1* | 12/2014 | Mayrench | ...... | H04L 5/0028 375/260 |
| 8,923,143 B2* | 12/2014 | Gorokhov | ...... | H04L 1/0026 370/252 |
| 8,948,104 B2* | 2/2015 | Clerckx | ...... | H04W 24/10 370/329 |
| 9,042,480 B2* | 5/2015 | Onggosanusi | ...... | H04B 7/0426 375/260 |
| 9,107,087 B2* | 8/2015 | Li | ...... | H04L 1/0026 |
| 9,225,409 B2* | 12/2015 | Liu | ...... | H04B 7/0486 |
| 9,232,529 B2* | 1/2016 | Song | ...... | H04W 72/085 |
| 9,271,221 B2 | 2/2016 | Tong et al. | | |
| 9,369,955 B2* | 6/2016 | Wang | ...... | H04W 52/0206 |
| 9,497,750 B2* | 11/2016 | Li | ...... | H04W 72/042 |
| 9,596,017 B1* | 3/2017 | Mayrench | ...... | H04L 5/0028 |
| 9,655,086 B2* | 5/2017 | Chen | ...... | H04W 72/0413 |
| 9,699,724 B2* | 7/2017 | Wang | ...... | H04W 52/0206 |
| 9,723,496 B2* | 8/2017 | Yoo | ...... | H04B 7/0678 |
| 9,941,947 B2* | 4/2018 | Liu | ...... | H04B 7/0486 |
| 10,027,392 B2* | 7/2018 | Lee | ...... | H04B 7/0486 |
| 10,200,999 B2* | 2/2019 | Rahmati | ...... | H04J 11/005 |
| 10,390,246 B2* | 8/2019 | Liu | ...... | H04W 24/10 |
| 2005/0276317 A1* | 12/2005 | Jeong | ...... | H04B 7/0689 375/213 |
| 2005/0281350 A1* | 12/2005 | Chae | ...... | H04B 7/068 375/267 |
| 2006/0098568 A1 | 5/2006 | Oh et al. | | |
| 2006/0114858 A1* | 6/2006 | Walton | ...... | H04B 7/0417 370/335 |
| 2006/0198460 A1* | 9/2006 | Airy | ...... | H04B 7/04 375/267 |
| 2007/0183529 A1* | 8/2007 | Tujkovic | ...... | H04B 7/0413 375/267 |
| 2007/0286105 A1* | 12/2007 | Kim | ...... | H04B 7/0691 370/310.1 |
| 2008/0144733 A1* | 6/2008 | ElGamal | ...... | H04L 1/0003 375/267 |
| 2008/0317146 A1* | 12/2008 | Kwon | ...... | H04L 1/0071 375/260 |
| 2009/0028264 A1* | 1/2009 | Zhang | ...... | H04L 1/0606 375/267 |
| 2010/0296603 A1* | 11/2010 | Lee | ...... | H04L 1/0071 375/295 |
| 2011/0129029 A1* | 6/2011 | Liu | ...... | H04B 7/0669 375/267 |
| 2011/0134850 A1* | 6/2011 | Kishigami | ...... | H04B 7/0452 370/328 |
| 2011/0149765 A1* | 6/2011 | Gorokhov | ...... | H04L 1/0026 370/252 |
| 2012/0002596 A1* | 1/2012 | Kim | ...... | H04B 7/0413 370/315 |
| 2012/0034948 A1* | 2/2012 | Wang | ...... | H04W 52/0206 455/522 |
| 2012/0064846 A1* | 3/2012 | Yokomakura | ...... | H04B 7/0689 455/101 |
| 2012/0076023 A1* | 3/2012 | Ko | ...... | H04B 7/0486 370/252 |
| 2012/0076102 A1* | 3/2012 | Ko | ...... | H04B 7/0654 370/329 |
| 2012/0106388 A1* | 5/2012 | Shimezawa | ...... | H04B 7/024 370/252 |
| 2012/0202545 A1* | 8/2012 | Nakayama | ...... | H01Q 1/246 455/509 |
| 2012/0213169 A1* | 8/2012 | Wang | ...... | H04B 7/04 370/329 |
| 2012/0327875 A1* | 12/2012 | Han | ...... | H04L 27/2602 370/329 |
| 2013/0064216 A1* | 3/2013 | Gao | ...... | H04L 5/0016 370/330 |
| 2013/0077703 A1* | 3/2013 | Kotecha | ...... | H04L 1/06 375/267 |
| 2013/0083681 A1* | 4/2013 | Ebrahimi Tazeh Mahalleh ......... H04L 5/0057 370/252 |
| 2013/0094349 A1* | 4/2013 | Hoshino | ...... | H04L 1/1893 370/216 |
| 2013/0094543 A1* | 4/2013 | Zhang | ...... | H04L 5/0023 375/219 |
| 2013/0100914 A1* | 4/2013 | Nakamura | ...... | H04B 7/0413 370/329 |
| 2013/0128832 A1* | 5/2013 | Kang | ...... | H04W 72/042 370/329 |
| 2013/0145239 A1* | 6/2013 | Pi | ...... | H04L 1/0003 714/807 |
| 2013/0230118 A1* | 9/2013 | Onggosanusi | ...... | H04B 7/0426 375/267 |
| 2014/0086351 A1* | 3/2014 | Nammi | ...... | H04L 25/03929 375/267 |
| 2014/0105162 A1* | 4/2014 | Li | ...... | H04W 72/042 370/329 |
| 2014/0205038 A1* | 7/2014 | Nakamura | ...... | H04L 25/0391 375/267 |
| 2014/0302891 A1* | 10/2014 | Wang | ...... | H04W 52/0206 455/562.1 |
| 2014/0328422 A1* | 11/2014 | Chen | ...... | H04B 7/0486 375/267 |
| 2014/0376424 A1* | 12/2014 | Seo | ...... | H04L 1/0026 370/280 |
| 2015/0117350 A1* | 4/2015 | Seo | ...... | H04L 1/06 370/329 |
| 2016/0192229 A1* | 6/2016 | Liu | ...... | H04L 1/0026 455/423 |
| 2016/0255582 A1* | 9/2016 | Wang | ...... | H04W 52/0206 455/562.1 |
| 2016/0295426 A1* | 10/2016 | Gormley | ...... | H04W 24/02 |
| 2019/0020389 A1* | 1/2019 | Liu | ...... | H04B 7/0417 |

(56) References Cited

U.S. PATENT DOCUMENTS

2019/0158160 A1   5/2019   Wu et al.
2019/0173607 A1*  6/2019   Liu ..................... H04B 7/0404

FOREIGN PATENT DOCUMENTS

| CN | 101057417 | A  | 10/2007 |
| CN | 101378299 | A  | 3/2009  |
| CN | 101689898 | A  | 3/2010  |
| CN | 101997649 | A  | 3/2011  |
| CN | 103891226 | A  | 6/2014  |
| CN | 103973409 | A  | 8/2014  |
| CN | 107733492 | A  | 2/2018  |
| WO | 2011043475 | A1 | 4/2011 |
| WO | 2016054389 | A1 | 4/2016 |

OTHER PUBLICATIONS

Office Action issued in Chinese Application No. 201610652565.7 dated Nov. 29, 2019, 17 pages (with English translation).
Office Action issued in Chinese Application No. 201610839205.8 dated Dec. 2, 2019, 10 pages.

* cited by examiner

TRANSMIT DIVERSITY METHOD, DEVICE, AND SYSTEM

CROSS-REFERENCE TO RELATED APPLICATIONS

This application is a continuation of International Application No. PCT/CN2016/076044 filed on Mar. 10, 2016, the disclosure of which is hereby incorporated by reference in its entirety.

TECHNICAL FIELD

The present application relates to the field of communications technologies, and in particular, to a transmit diversity method, a device, and a system.

BACKGROUND

Communication between base stations includes backhaul (back haul) link communication and fronthaul link communication. Backhaul refers to a network from a base station controller to a serving gateway or a mobility management entity, and fronthaul refers to a network from a baseband processing unit (BBU) of an antenna to the base station controller. Backhaul and fronthaul impose very high requirements on reliability. For example, a packet error rate (PER) of backhaul needs to be $10^{-6}$, and a packet error rate of fronthaul needs to be $10^{-8}$. In addition, the backhaul link communication and the fronthaul link communication are usually deployed in a high frequency, and a space loss of the high frequency is very large. Therefore, a higher requirement is imposed on reliability of transmission in a high-frequency environment.

Currently, transmission reliability is improved mainly by using a diversity solution. A basic idea of diversity is: If a plurality of independently fading signals can be transmitted, from the perspective of statistics, fading of a combined signal is much lower than fading of each signal. Under the assumption of independent fading, when some signals fade deeply, fading of some other signals may be relatively slight, and a probability that signals deeply fade simultaneously is very low. Therefore, a probability that a combined signal deeply fades is greatly reduced. The diversity solution includes space time coding (STC), cyclic delay diversity (CDD), antenna switching diversity, and the like. A diversity solution combining space frequency block coding (SFBC) and frequency switched transmit diversity (FSTD) is often used in Long Term Evolution (LTE). As shown in FIG. 1, FIG. 1 shows an SFBC diversity solution in LTE. First, scrambling processing, modulation processing, processing of an SFBC encoder, processing of a resource element mapper, and processing of an orthogonal frequency division multiplexing (OFDM) signal generator are sequentially performed on a to-be-sent signal, and finally, the data is sent by using antenna ports. For an SFBC encoder with two transmit antennas, assuming that data symbols flowing to the SFBC encoder are $X_{2k}$ and $X_{2k+1}$, $X_{2k}$ is transmitted on a first subcarrier on antenna 1, and $X_{2k+1}$ is transmitted on a second subcarrier, while $-X_{2k+1}$ is transmitted on a first subcarrier on antenna 2, and $X_{2k}$ is transmitted on a second subcarrier. ( )* represents conjugate of a complex number. In the diversity solution, repeated data is sent in a frequency and space, to improve transmission reliability, thereby improving reliability of receiving information by user equipment. However, for a high-frequency environment having a very great space loss, an antenna gain of the diversity solution is relatively low, the space loss cannot be overcome, and as a result, transmission reliability is severely affected.

SUMMARY

Embodiments of the present disclosure provide a transmit diversity method and a device, so that diversity coding similar to space frequency block coding is combined with precoding, thereby increasing an antenna gain, further reducing a space loss, and improving data transmission reliability.

A first aspect of the embodiments of the present disclosure provides a transmit diversity method, including:

receiving, by a first network device, rank index information and precoding matrix index information that are sent by a second network device;

determining, by the first network device, a diversity coding scheme based on the rank index information;

determining, by the first network device, a precoding matrix based on the precoding matrix index information; and performing, by the first network device, transmission processing on to-be-transmitted data based on the diversity coding scheme and the precoding matrix.

In the first aspect of the embodiments of the present disclosure, diversity coding similar to space frequency block coding is combined with precoding, so that an antenna gain can be increased, further a space loss can be reduced, and data transmission reliability can be improved.

Based on the first aspect of the embodiments of the present disclosure, in a first possible implementation of the first aspect of the embodiments of the present disclosure, if the rank index information is a first preset rank 2, the first network device determines the diversity coding scheme as a first diversity coding scheme; and/or if the rank index information is a second preset rank 4, the first network device determines the diversity coding scheme as a second diversity coding scheme.

The first possible implementation of the first aspect of the embodiments of the present disclosure provides two ranks and two diversity coding schemes, and different diversity coding schemes are determined based on different ranks.

Based on the first possible implementation of the first aspect of the embodiments of the present disclosure, in a second possible implementation of the first aspect of the embodiments of the present disclosure, a specific process of continuing, by the first network device, to perform transmission processing on to-be-transmitted data based on the diversity coding scheme and the precoding matrix is:

performing, by the first network device, coding, scrambling, and modulation processing on the to-be-transmitted data, to obtain first data;

processing, by the first network device, the first data based on the diversity coding scheme, to obtain second data;

performing, by the first network device, precoding processing on the second data based on the precoding matrix, to obtain third data; and performing, by the first network device, resource block mapping and OFDM signal generation processing on the third data, and sending the third data.

The second possible implementation of the first aspect of the embodiments of the present disclosure is a complete process of transmission processing. The diversity coding similar to the space frequency block coding is combined with the precoding, so that not only an SFBC diversity gain can be obtained, but also a precoding gain can be obtained, thereby increasing an antenna gain.

Based on the second possible implementation of the first aspect of the embodiments of the present disclosure, in a third possible implementation of the first aspect of the embodiments of the present disclosure, if the diversity coding scheme is the first diversity coding scheme, the first network device processes the first data by using the first diversity coding scheme, to obtain the second data, where data symbols of the first data are d(2k), 2k=0, 1, . . . , $M_{symb}-1$, and $M_{symb}$ represents a quantity of data symbols of the to-be-transmitted data, where the first diversity coding scheme is:

$$X_{2k,1}=d(2k) \; X_{2k,2}=d(2k+1)$$

$$X_{2k+1,1}=-(d(2k+1))^* \; X_{2k+1,2}=(d(2k))^*$$

where $X_{2k,1}$ represents a data symbol to which first-layer data is mapped on a $2k^{th}$ subcarrier, and corresponds to a data symbol d(2k) of the first data; $X_{2k+1,1}$ represents a data symbol to which the first-layer data is mapped on a $2k+1^{th}$ subcarrier, and corresponds to a data symbol $-(d(2k+1))^*$ of the first data; $X_{2k,2}$ represents a data symbol to which second-layer data is mapped on the $2k^{th}$ subcarrier, and corresponds to a data symbol d(2k+1) of the first data; $X_{2k+1,2}$ represents a data symbol to which the second-layer data is mapped on the $2k+1^{th}$ subcarrier, and corresponds to a data symbol $(d(2k))^*$ of the first data; and data symbols of the second data are represented as X; or the first diversity coding scheme is:

$$X_{2k,1}=d(2k) \; X_{2k+1,1}=d(2k+1)$$

$$X_{2k,2}=-(d(2k+1))^* \; X_{2k+1,2}=(d(2k))^*$$

where $X_{2k,1}$ represents a data symbol to which first-layer data is mapped on a $2k^{th}$ subcarrier, and corresponds to a data symbol d(2k) of the first data; $X_{2k+1,1}$ represents a data symbol to which the first-layer data is mapped on a $2k+1^{th}$ subcarrier, and corresponds to a data symbol d(2k+1) of the first data; $X_{2k,2}$ represents a data symbol to which second-layer data is mapped on the $2k^{th}$ subcarrier, and corresponds to a data symbol $-(d(2k+1))^*$ of the first data; $X_{2k+1,2}$ represents a data symbol to which the second-layer data is mapped on the $2k+1^{th}$ subcarrier, and corresponds to a data symbol $(d(2k))^*$ of the first data; and data symbols of the second data are represented as X.

Based on the second possible implementation of the first aspect of the embodiments of the present disclosure, in a fourth possible implementation of the first aspect of the embodiments of the present disclosure, if the diversity coding scheme is the second diversity coding scheme, the first network device processes the first data by using the second diversity coding scheme, to obtain the second data, where data symbols of the first data are d(2k), 2k=0, 1, . . . , $M_{symb}-1$, and $M_{symb}$ represents a quantity of data symbols of the to-be-transmitted data, where the second diversity coding scheme is:

$$X_{2k,1}=d(2k) \; X_{2k+1,1}=d(2k+1)$$

$$X_{2k,2}=-(d(2k+1))^* \; X_{2k+1,2}=(d(2k))^*$$

$$X_{2k,3}=d(2k+2) \; X_{2k+1,3}=d(2k+3)$$

$$X_{2k,4}=-(d(2k+3))^* \; X_{2k+1,4}=(d(2k+2))^*$$

where $X_{2k,1}$ represents a data symbol to which first-layer data is mapped on a $2k^{th}$ subcarrier, and corresponds to a data symbol d(2k) of the first data; $X_{2k+1,2}$ represents a data symbol to which the first-layer data is mapped on a $2k+1^{th}$ subcarrier, and corresponds to a data symbol d(2k+1) of the first data; $X_{2k,2}$ represents a data symbol to which second-layer data is mapped on the $2k^{th}$ subcarrier, and corresponds to a data symbol $-(d(2k+1))^*$ of the first data; $X_{2k+1,2}$ represents a data symbol to which the second-layer data is mapped on the $2k+1^{th}$ subcarrier, and corresponds to a data symbol $(d(2k))^*$ of the first data; $X_{2k,3}$ represents a data symbol to which third-layer data is mapped on the $2k^{th}$ subcarrier, and corresponds to a data symbol d(2k+2) of the first data; $X_{2k+1,3}$ represents a data symbol to which the third-layer data is mapped on the $2k+1^{th}$ subcarrier, and corresponds to a data symbol d(2k+3) of the first data; $X_{2k,4}$ represents a data symbol to which fourth-layer data is mapped on the $2k^{th}$ subcarrier, and corresponds to a data symbol $-(d(2k+3))^*$ of the first data; $X_{2k+1,4}$ represents a data symbol to which the second-layer data is mapped on the $2k+1^{th}$ subcarrier, and corresponds to a data symbol $(d(2k+2))^*$ of the first data; and data symbols of the second data are represented as X.

The third possible implementation and the fourth possible implementation of the first aspect of the embodiments of the present disclosure are specific processing processes performed by using two diversity coding schemes, so that the SFBC diversity gain can be obtained.

Based on the fourth possible implementation of the first aspect of the embodiments of the present disclosure, in a fifth possible implementation of the first aspect of the embodiments of the present disclosure, if d(2k) and d(2k+2) are same data, and d(2k+1) and d(2k+3) are same data, repeated data exists in the second data, helping to improve the data transmission reliability; or if d(2k) and d(2k+2) are different data, and d(2k+1) and d(2k+3) are different data, no repeated data exists in the second data, helping to improve the data transmission reliability.

Based on the third to the fifth possible implementations of the first aspect of the embodiments of the present disclosure, in a sixth possible implementation of the first aspect of the embodiments of the present disclosure, the first network device performs precoding processing on the second data in a precoding scheme based on the precoding matrix, to obtain the third data, where the precoding scheme is Y=WX, where W is the precoding matrix, X is the data symbol of the second data, and Y is a data symbol of the third data.

The sixth possible implementation of the first aspect of the embodiments of the present disclosure is a specific precoding processing process, to obtain the precoding gain.

A second aspect of the embodiments of the present disclosure provides another transmit diversity method, including:

measuring, by a second network device, channel state information based on a pilot signal; and sending, by the second network device, rank index information and precoding matrix index information to a first network device based on the channel state information, so that the first network device determines a diversity coding scheme based on the rank index information, determines a precoding matrix based on the precoding matrix index information, and performs transmission processing on to-be-transmitted data based on the diversity coding scheme and the precoding matrix.

In the second aspect of the embodiments of the present disclosure, the rank index information and the precoding matrix index information are sent to the first network device, so that the first network device determines the diversity coding scheme and the precoding matrix, and further, the first network device combines space frequency block coding with precoding.

Based on the second aspect of the embodiments of the present disclosure, in a first possible implementation of the second aspect of the embodiments of the present disclosure, a specific process of sending, by the second network device, rank index information and precoding matrix index information to a first network device is:

sending, by the second network device, the rank index information to the first network device based on the channel state information;

selecting, by the second network device, the precoding matrix from a preset precoding codebook based on the channel state information; and determining, by the second network device, the precoding matrix index information based on the precoding matrix, and sending the precoding matrix index information to the first network device.

A third aspect of the embodiments of the present disclosure provides a first network device, including:

an information receiving unit, configured to receive rank index information and precoding matrix index information that are sent by a second network device;

a manner determining unit, configured to determine a diversity coding scheme based on the rank index information;

a matrix determining unit, configured to determine a precoding matrix based on the precoding matrix index information; and a transmission processing unit, configured to perform transmission processing on to-be-transmitted data based on the diversity coding scheme and the precoding matrix.

The first network device provided in the third aspect of the embodiments of the present disclosure is configured to implement the transmit diversity method provided in the first aspect of the embodiments of the present disclosure, and details are not described herein again.

A fourth aspect of the embodiments of the present disclosure provides a second network device, including:

an information measurement unit, configured to measure channel state information based on a pilot signal; and an information sending unit, configured to send rank index information and precoding matrix index information to a first network device based on the channel state information, so that the first network device determines a diversity coding scheme based on the rank index information, determines a precoding matrix based on the precoding matrix index information, and performs transmission processing on to-be-transmitted data based on the diversity coding scheme and the precoding matrix.

The second network device provided in the fourth aspect of the embodiments of the present disclosure is configured to implement the transmit diversity method provided in the second aspect of the embodiments of the present disclosure, and details are not described herein again.

A fifth aspect of the embodiments of the present disclosure provides another first network device. The first network device includes a receiver, a transmitter, a memory, and a processor, where the memory stores a group of program code, and the processor is configured to invoke the program code stored in the memory, so that the first network device performs the transmit diversity method provided in Embodiment 1 of the present disclosure.

A sixth aspect of the embodiments of the present disclosure provides another second network device. The second network device includes an input module, an output module, a memory, and a processor, where the memory stores a group of program code, and the processor is configured to invoke the program code stored in the memory, so that the second network device performs the transmit diversity method provided in Embodiment 2 of the present disclosure.

A seventh aspect of the embodiments of the present disclosure provides a transmit diversity system, including the first network device provided in the third aspect of the embodiments of the present disclosure and the second network device provided in the fourth aspect, or the first network device provided in the fifth aspect of the embodiments of the present disclosure and the second network device provided in the sixth aspect.

In the embodiments of the present disclosure, the second network device measures the channel state information based on the pilot signal, and sends the rank index information and the precoding matrix index information to the first network device. The first network device receives the rank index information and the precoding matrix information that are sent by the second network device, determines the diversity coding scheme based on the rank index information, determines the precoding matrix based on the precoding matrix index information, and performs transmission processing on the to-be-transmitted data based on the determined diversity coding scheme and the precoding matrix index information. Therefore, the diversity coding similar to the space frequency block coding is combined with the precoding, so that the antenna gain is increased, further, the space loss is reduced, and the data transmission reliability is improved.

BRIEF DESCRIPTION OF THE DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
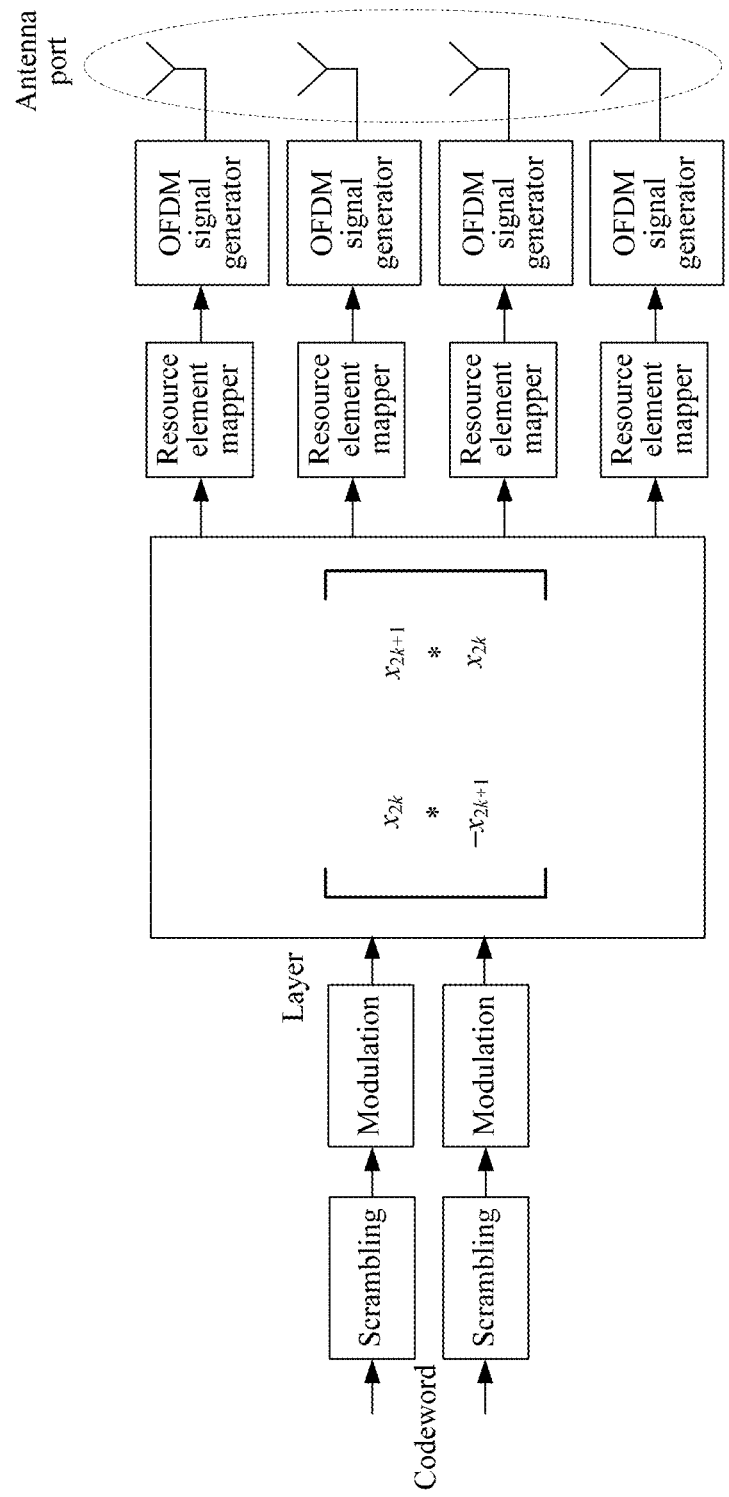
FIG. 1 is a schematic flowchart of a transmit diversity solution used in existing LTE.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The embodiments of the present disclosure provide a transmit diversity method, a device, and a system that may be applied to a scenario in which data is transmitted in a high-frequency environment, for example, a scenario in which a second network device measures channel state information based on a pilot signal, and sends rank index information and precoding matrix index information to a first network device based on the channel state information; the first network device receives the rank index information and the precoding matrix index information that are sent by the second network device based on the channel state information; the first network device determines a diversity coding scheme based on the rank index information; the first network device determines a precoding matrix based on the precoding matrix index information; and the first network device performs transmit diversity processing on to-be-transmitted data based on the diversity coding scheme and the precoding matrix. Based on an existing diversity solution, in the embodiments of the present disclosure, space frequency block coding is improved, precoding is added, and diversity coding similar to the space frequency block coding is combined with the precoding, so that both an SFBC diversity gain and a precoding gain can be obtained, thereby increasing an antenna gain, further reducing a space loss, and improving data transmission reliability.

The first network device in the embodiments of the present disclosure is a part or all of a base station, and the base station may be a base station in any network scenario. The second network device in the embodiments of the present disclosure is user equipment, and may include but is not limited to an electronic device having a communication function, for example, a mobile phone, a tablet computer, a hand ring, a watch, or an intelligent wearable device. A precondition of implementing the embodiments of the present disclosure is that the base station configures a new transmission mode for the second network device, namely, a transmission mode in which the diversity coding similar to the space frequency block coding is combined with the precoding.

The transmit diversity system in the embodiments of the present disclosure includes a first network device and a second network device. In this system, there may be more than one second network device. One second network device in the system is described in the embodiments of the present disclosure, and an implementation of the other second network device is the same as that of the second network device in the embodiments of the present disclosure. The second network device in the embodiments of the present disclosure is located in network coverage of a base station corresponding to the first network device. A communication process of the second network device is controlled by the base station. The base station may allocate a transmission resource, a channel, and the like to the second network device, and send information to the second network device by using an antenna port of the base station.

The following describes, in detail with reference to FIG. 2 to FIG. 6, the transmit diversity method provided in the embodiments of the present disclosure.

Figure 2:
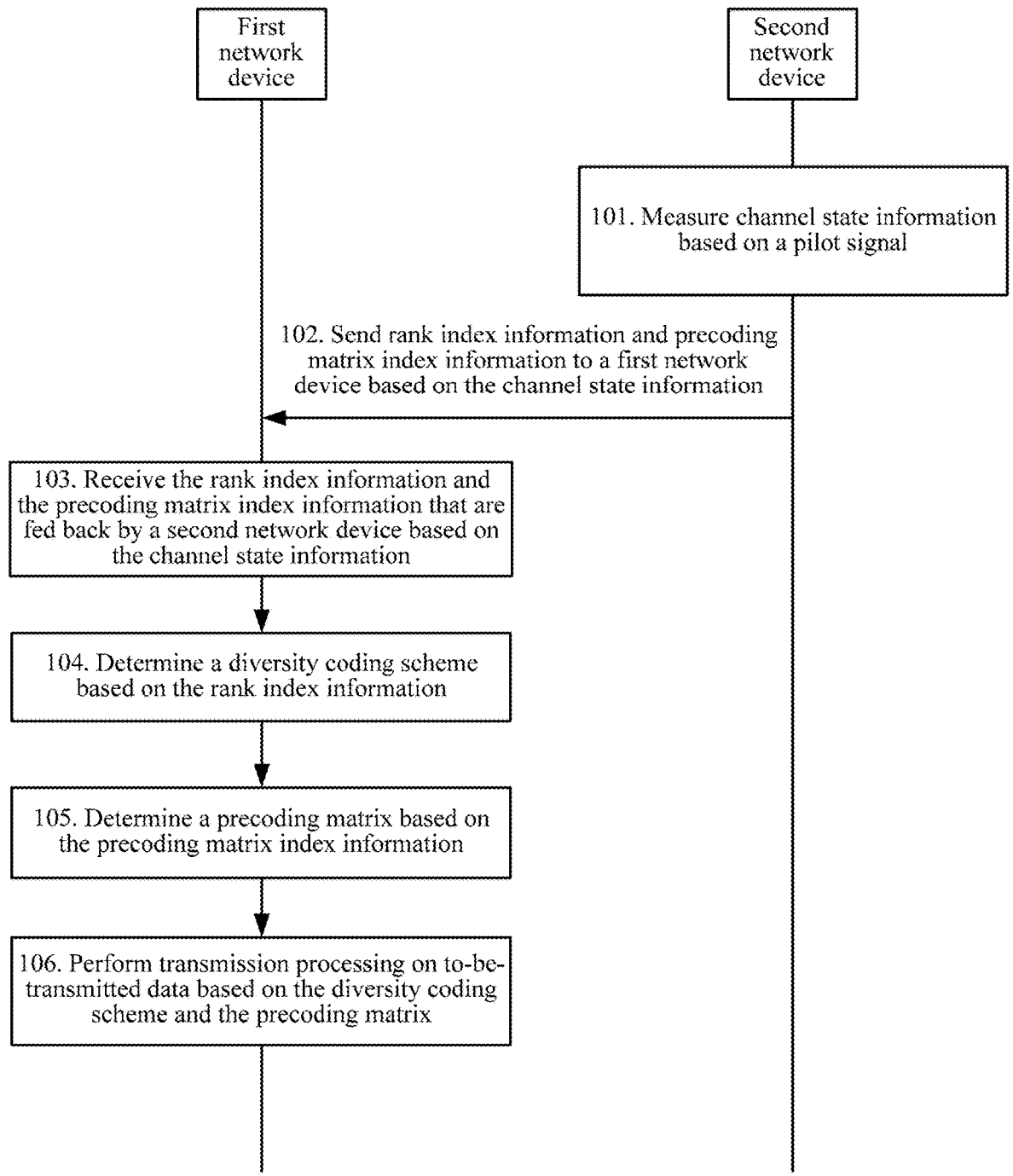
FIG. 2 is a schematic flowchart of a transmit diversity method according to Embodiment 1 of the present disclosure.

Referring to FIG. 2, FIG. 2 is a schematic flowchart of a transmit diversity method according to Embodiment 1 of the present disclosure. As shown in FIG. 2, the method provided in Embodiment 1 of the present disclosure may include content of 101 to 106.

101. A second network device measures channel state information based on a pilot signal.

Specifically, before the second network device measures the channel state information based on the pilot signal, a first network device sends the pilot signal to the second network device by using an air interface between the first network device and the second network device, so that the second network device measures the channel state information based on the pilot signal, and sends rank index information and precoding matrix index information to the first network device. The pilot signal is a signal sent for the purpose of measurement or monitoring in a telecommunications network, and is transmitted by using a physical channel. The pilot signal may be sent by the first network device, or may be sent by a base station of the first network device. The pilot signal may be a channel state information-reference signal (CSI-RS), and the CSI-RS is a periodically sent pilot signal.

The second network device receives, by using the air interface between the first network device and the second network device, the pilot signal sent by the first network device, and measures the channel state information based on the pilot signal when receiving the pilot signal. The channel state information may include information such as a channel quality indicator (CQI), a precoding matrix index (PMI), and a rank index (RI).

The CQI is a standard of measuring communication quality of a radio channel. The CQI may be one value (or a plurality of values) capable of representing a channel measurement standard of a given channel. Usually, a high-value CQI may represent that a channel has high quality, and vice versa.

The PMI is used to indicate a precoding matrix. Precoding is an adaptive technology of a multiple-antenna system. In other words, the second network device determines the PMI based on the channel state information, and further determines the precoding matrix based on the PMI. A set of codebook including several precoding matrices is stored in each of the first network device and the second network device. In this way, the second network device may select one precoding matrix based on an estimated channel matrix and a criterion, and send an index value of the precoding matrix and quantized channel state information to the first network device. If the first network device sends the pilot signal to the second network device again after receiving the PMI sent by the second network device, the second network device re-measures the channel state information, determines a new PMI and a new precoding matrix, and sends the new PMI to the first network device. The first network device re-determines a precoding matrix based on the new PMI.

RI represents a rank in an antenna matrix in a multiple-input multiple-output (MIMO) system. If the RI is N, it represents N concurrent valid data streams. A quantity of data stream used for actual transmission in the MIMO system is referred to as a quantity of layers. The RI may represent relevancy between a plurality of transmission channels between the first network device and the second network device. If the RI is 1, it represents that the plurality of transmission channels are completely relevant, and transmitted signals possibly may interfere with each other. As a result, the second network device can hardly accurately receive the signals. If the RI is greater than 1, it represents that the plurality of channels are independent and irrelevant. The second network device may receive signals on different channels, and perform independent or joint decoding according to a precoding rule, thereby improving transmission reliability and increasing a channel capacity.

102. The second network device sends rank index information and precoding matrix index information to the first network device based on the channel state information.

Specifically, the second network device extracts the rank index information and the precoding matrix index information in the measured channel state information, and sends the rank index information and the precoding matrix index information to the first network device by using the air interface between the second network device and the first network device. The second network device may perform sending to the first network device periodically or non-periodically. This depends on a specific case, and a specific sending period is not limited herein. Currently, the second network device sends all measured channel state information to the first network device, and in this embodiment of the present disclosure, the second network device needs to send only the rank index information and the precoding matrix index information in the channel state information. In addition, the rank index information is in this embodiment of the present disclosure is a first preset rank 2 or a second preset rank 4. However, current rank index information not only may be the first preset rank 2 or the second preset rank 4, but also may be another rank, and as a result, a plurality of ranks need to be traversed before a rank to be sent to the first network device is determined. In this embodiment of the present disclosure, there are only two ranks, thereby reducing an operation time to some extent.

Optionally, the second network device selects a precoding matrix from a preset precoding codebook based on the channel state information, and the second network device determines the precoding matrix index information based on the precoding matrix, and sends the precoding matrix index information to the first network device. The preset precoding codebook is stored in each of the second network device and the first network device. The second network device determines the precoding matrix index information based on the preset precoding codebook, and the first network device determines, based on the preset precoding codebook, a precoding codebook corresponding to the precoding matrix index information.

103. The first network device receives the rank index information and the precoding matrix index information that are sent by the second network device based on the channel state information.

Specifically, the first network device receives, by using the air interface between the second network device and the first network device, the rank index information and the precoding matrix index information that are sent by the second network device based on the channel state information.

104. The first network device determines a diversity coding scheme based on the rank index information.

Figure 3:
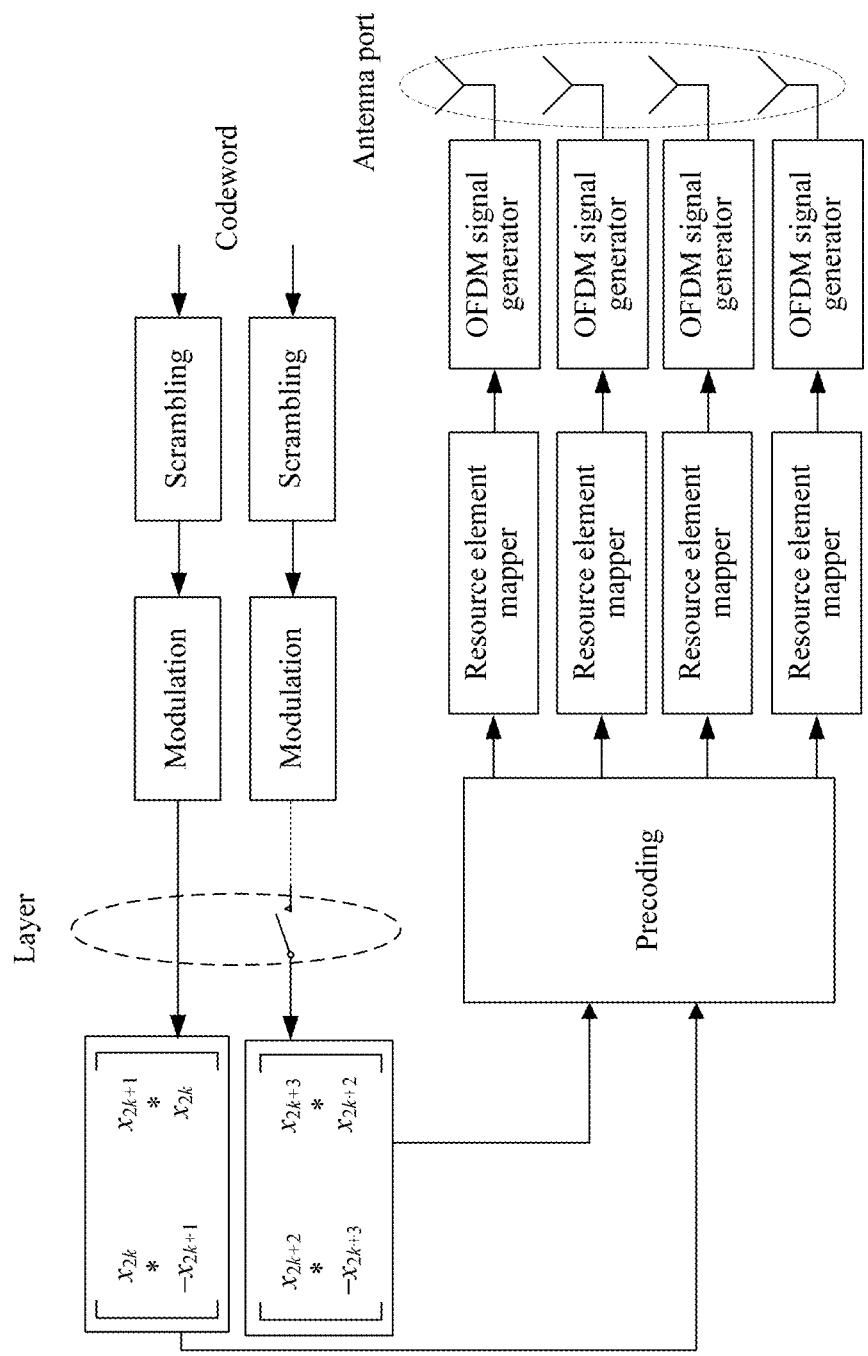
FIG. 3 is a schematic flowchart of a transmit diversity solution according to an embodiment of the present disclosure.

Specifically, because orthogonality between data paths on different MIMO channels is different, interference between data streams needs to be considered in an actual application. When a plurality of code words are transmitted by using a plurality of antennas, a quantity of data streams, in other words, a quantity of layers, that can be sent at the same time needs to be determined based on a rank of a space channel, to reduce interference between information, improve receiving accuracy, and increase an information transmission capacity. The first network device determines whether the received rank index information is the first preset rank 2 or the second preset rank 4, and determines the diversity coding scheme based on a determining result. Referring to FIG. 3, the diversity coding scheme is similar to SFBC coding shown in FIG. 1. However, the SFBC coding in FIG. 1 is coding of only two layers of data, while diversity coding in this embodiment of the present disclosure is applied to coding of two layers of data or coding of four layers of data. The diversity coding scheme is two space frequency block coding matrices in FIG. 3. Data symbols in the first row of the first matrix are $x_{2k}$ and $x_{2k+1}$, and data symbols in the first row of the second matrix are 2k+2 and $x_{2k+3}$, $x_{2k}$ and $x_{2k+2}$ may represent data symbols of same data, or may represent different data symbols of different data. $x_{2k+1}$ and $x_{2k+3}$ may represent data symbols of same data, or may represent different data symbols of different data. There is a switch between modulation and the space frequency block coding matrices. When the rank index information is the first preset rank 2, the first network device controls the switch to be disconnected, so that a quantity of layers of data flowing into the space frequency block coding matrices is two. When the rank index information is the second preset rank 4, the first network device controls the switch to be connected, so that a quantity of layers of data flowing into the space frequency block coding matrices is four. It may be understood that the first network device controls, based on the rank index information, the switch to be disconnected or connected, to further determine the diversity coding scheme.

Optionally, if the rank index information is the first preset rank 2, the first network device determines the diversity coding scheme as a first diversity coding scheme, and the first diversity coding scheme is a diversity coding scheme for two layers of data.

Optionally, if the rank index information is the second preset rank 4, the first network device determines the transmit diversity manner as a second diversity coding scheme, and the second diversity coding scheme is a diversity coding scheme for four layers of data.

105. The first network device determines a precoding matrix based on the precoding matrix index information.

Specifically, the first network device determines the precoding matrix based on the precoding matrix index information sent by the second network device, in other words, determines the precoding matrix used for precoding in FIG. 3. Precoding may be classified into linear precoding and non-linear precoding. For linear precoding, a side receiving channel state information can perform decoding only by using some linear detection means. The linear detection means mainly include linear zero forcing (including a beamforming method and the like), channel inversion, and the like. Design of non-linear precoding is complex. Common non-linear precoding is dirty-paper coding, and generally, N relevant non-linear equations need to be processed. Because non-linear precoding has high complexity and a decoding algorithm is complex, a linear precoding technology is used in LTE, and the linear precoding technology is also used in this embodiment of the present disclosure. A linear precoding operation may be expressed as:

$$Y=WX$$

where W is a precoding matrix, X is transmitted data, in other words, data input for precoding, and Y is a new transmit vector obtained after precoding processing is performed on transmission information, in other words, data output after precoding.

The linear precoding operation may be classified into two categories of precoding schemes based on locations of obtaining precoding matrices thereof: a non-codebook-based precoding operation and a codebook-based precoding operation.

In the non-codebook-based precoding scheme, a precoding matrix is obtained on a base station side. The base station side calculates a precoding matrix by using predicted channel state information (CSI). A common precoding matrix calculation method includes singular value decomposition, uniform channel decomposition, and the like. In the non-codebook-based precoding scheme, a dedicated pilot needs to be used. In other words, a data symbol and a pilot symbol are used together for a precoding operation. In this way, a user side can obtain, only through channel estimation, an equivalent channel after precoding, facilitating data demodulation.

In the codebook-based precoding scheme, a precoding matrix is obtained on a user side. The second network device selects a precoding matrix from a predetermined precoding codebook by using measured channel state information, and sends a sequence number (PMI) of the selected precoding matrix to a base station. The precoding matrix codebook is constructed in a plurality of manners, for example, a codebook based on antenna selection, a codebook based on an adaptive array transmit mode, a codebook based on discrete Fourier transform, or a random codebook. The precoding matrix may be selected from the predetermined precoding matrix codebook based on performance indicator-based selection and quantization-based selection.

In this embodiment of the present disclosure, the first network device selects the precoding matrix from the preset precoding codebook based on the precoding index information, to determine the precoding matrix.

106. The first network device performs transmission processing on to-be-transmitted data based on the diversity coding scheme and the precoding matrix.

Specifically, after the diversity coding scheme and the precoding matrix are determined, the first network device performs transmission processing on the to-be-transmitted data based on the determined diversity coding scheme and precoding matrix. The first network device performs coding, scrambling, and modulation processing on the to-be-transmitted data, to obtain first data. Data symbols of the to-be-transmitted data are represented as $a(0), \ldots, a(M_{symb}-1)$, in other words, code words in FIG. 3. The code words are coded, and then, scrambling and modulation processing in FIG. 3 are performed on the code words, to obtain the first data. Data symbols of the first data are represented as $d(0), \ldots, d(M_{symb}-1)$, and $M_{symb}$ represents a quantity of data symbols of the to-be-transmitted data. There may be one or two code words. If there is one code word, $M_{symb}$ is a quantity of data symbols of the code word, to be specific, a quantity of the code words included in the to-be-transmitted data. If there are two code words, $M_{symb}$ is a sum of quantities of data symbols of the two code words, and includes a quantity $M_{symb}^{(0)}$ of data symbols of the first code word and a quantity $M_{symb}^{(1)}$ of data symbols of the second code word. Data symbols of the first code word are represented as $d^{(0)}(i), i=0, 1, \ldots, M_{symb}^{(0)}$, and data symbols of the second code word are represented as $d^{(1)}(i), i=0, 1, \ldots, M_{symb}^{(1)}$. A specific coding scheme and a specific scrambling manner are not limited in this embodiment of the present disclosure. For different downlink channels, modulation schemes are different. For example, for a physical downlink shared channel (PDSCH), a modulation scheme is quadrature phase shift keying (QPSK), 16 quadrature amplitude modulation (QAM), or 64 QAM. Each code word of the to-be-transmitted data is coded, and the coded data is scrambled, so that the data is transmitted on one physical channel. The scrambled data is modulated, to generate complex modulation data symbols.

The first network device processes the first data based on the diversity coding scheme, to obtain second data. During diversity coding, the complex modulation data symbols are mapped to one or more transport layers. If the diversity coding scheme is determined as the first diversity coding scheme, the first network device processes the first data by using the first diversity coding scheme, to obtain the second data.

The first diversity coding scheme is:

$$X_{2k,1}=d(2k) \quad X_{2k,2}=d(2k+1)$$

$$X_{2k+1,1}=-(d(2k+1))^* \quad X_{2k+1,2}=(d(2k))^*$$

where $X_{2k,1}$ represents a data symbol to which first-layer data is mapped on a $2k^{th}$ subcarrier, and corresponds to a data symbol $d(2k)$ of the first data; $X_{2k+1,1}$ represents a data symbol to which the first-layer data is mapped on a $2k+1^{th}$ subcarrier, and corresponds to a data symbol $-(d(2k+1))^*$ of the first data; $X_{2k,2}$ represents a data symbol to which second-layer data is mapped on the $2k^{th}$ subcarrier, and corresponds to a data symbol $d(2k+1)$ of the first data; $X_{2k+1,2}$ represents a data symbol to which the second-layer data is mapped on the $2k+1^{th}$ subcarrier, and corresponds to a data symbol $(d(2k))^*$ of the first data; and data symbols of the second data are represented as X:

$$X = \begin{bmatrix} X_{2k,1} & X_{2k,2} \\ X_{2k+1,1} & X_{2k+1,2} \end{bmatrix}$$

where in the matrix X, the first row represents the $2k^{th}$ subcarrier, the second row represents the $2k+1^{th}$ subcarrier, the first column represents the first-layer data, and the second column represents the second-layer data.

Alternatively, the first diversity coding scheme is:

$$X_{2k,1}=d(2k) \quad X_{2k+1,2}=d(2k+1)$$

$$X_{2k,2}=-(d(2k+1))^* \quad X_{2k+1,1}=(d(2k))^*$$

where $X_{2k,1}$ represents a data symbol to which first-layer data is mapped on a $2k^{th}$ subcarrier, and corresponds to a data symbol $d(2k)$ of the first data; $X_{2k+1,1}$ represents a data symbol to which the first-layer data is mapped on a $2k+1^{th}$ subcarrier, and corresponds to a data symbol $d(2k+1)$ of the first data; $X_{2k,2}$ represents a data symbol to which second-layer data is mapped on the $2k^{th}$ subcarrier, and corresponds to a data symbol $-(d(2k+1))^*$ of the first data; $X_{2k+1,2}$ represents a data symbol to which the second-layer data is mapped on the $2k+1^{th}$ subcarrier, and corresponds to a data symbol $(d(2k))^*$ of the first data; and data symbols of the second data are represented as X:

$$X = \begin{bmatrix} X_{2k,1} & X_{2k+1,1} \\ X_{2k,2} & X_{2k+1,2} \end{bmatrix}$$

where in the matrix X, the first column represents the $2k^{th}$ subcarrier, the second column represents the $2k+1^{th}$ subcarrier, the first row represents the first-layer data, and the second row represents the second-layer data.

Optionally, the first diversity coding scheme is:

$X_{2k,1}=d(2k+1)$  $X_{2k,2}=d(2k)$ $X_{2k+1,1}=-(d(2k))^*$  $X_{2k+1,2}=(d(2k+1))^*$ where $X_{2k,1}$ represents a data symbol to which first-layer data is mapped on a $2k^{th}$ subcarrier, and corresponds to a data symbol $d(2k+1)$ of the first data; $X_{2k+1,1}$ represents a data symbol to which the first-layer data is mapped on a $2k+1^{th}$ subcarrier, and corresponds to a data symbol $-(d(2k))^*$ of the first data; $X_{2k,2}$ represents a data symbol to which second-layer data is mapped on the $2k^{th}$ subcarrier, and corresponds to a data symbol $d(2k)$ of the first data; $X_{2k+1,2}$ represents a data symbol to which the second-layer data is mapped on the $2k+1^{th}$ subcarrier, and corresponds to a data symbol $(d(2k+1))^*$ of the first data; and data symbols of the second data are represented as X:

$$X = \begin{bmatrix} X_{2k,1} & X_{2k,2} \\ X_{2k+1,1} & X_{2k+1,2} \end{bmatrix}$$

where in the matrix X, the first row represents the $2k^{th}$ subcarrier, the second row represents the $2k+1^{th}$ subcarrier, the first column represents the first-layer data, and the second column represents the second-layer data.

Alternatively, the first diversity coding scheme is:

$X_{2k,1}=d(2k+1)$  $X_{2k+1,1}=d(2k)$ $X_{2k,2}=-(d(2k))^*$  $X_{2k+1,2}=(d(2k+1))^*$ where $X_{2k,1}$ represents a data symbol to which first-layer data is mapped on a $2k^{th}$ subcarrier, and corresponds to a data symbol $d(2k+1)$ of the first data; $X_{2k+1,1}$ represents a data symbol to which the first-layer data is mapped on a $2k+1^{th}$ subcarrier, and corresponds to a data symbol $d(2k)$ of the first data; $X_{2k,2}$ represents a data symbol to which second-layer data is mapped on the $2k^{th}$ subcarrier, and corresponds to a data symbol $-(d(2k))^*$ of the first data; $X_{2k+1,2}$ represents a data symbol to which the second-layer data is mapped on the $2k+1^{th}$ subcarrier, and corresponds to a data symbol $(d(2k+1))^*$ of the first data; and data symbols of the second data are represented as X:

$$X = \begin{bmatrix} X_{2k,1} & X_{2k+1,1} \\ X_{2k,2} & X_{2k+1,2} \end{bmatrix}$$

where in the matrix X, the first column represents the $2k^{th}$ subcarrier, the second column represents the $2k+1^{th}$ subcarrier, the first row represents the first-layer data, and the second row represents the second-layer data.

If the diversity coding scheme is determined as the second diversity coding scheme, the first network device processes $d(2k)$, $2k=0, 1, \ldots, M_{symb}-1$ by using the second diversity coding scheme, to obtain the second data.

The second diversity coding scheme is as follows:

$X_{2k,1}=d(2k)$  $X_{2k+1,1}=d(2k+1)$ $X_{2k,2}=-(d(2k+1))^*$  $X_{2k+1,2}=(d(2k))^*$ $X_{2k,3}=d(2k+2)$  $X_{2k+1,3}=d(2k+3)$ $X_{2k,4}=-(d(2k+3))^*$  $X_{2k+1,4}=(d(2k+2))^*$ where $X_{2k,1}$ represents a data symbol to which first-layer data is mapped on a $2k^{th}$ subcarrier, and corresponds to a data symbol $d(2k)$ of the first data; $X_{2k+1,2}$ represents a data symbol to which the first-layer data is mapped on a $2k+1^{th}$ subcarrier, and corresponds to a data symbol $d(2k+1)$ of the first data; $X_{2k,2}$ represents a data symbol to which second-layer data is mapped on the $2k^{th}$ subcarrier, and corresponds to a data symbol $-(d(2k+1))^*$ of the first data; $X_{2k+1,2}$ represents a data symbol to which the second-layer data is mapped on the $2k+1^{th}$ subcarrier, and corresponds to a data symbol $(d(2k))^*$ of the first data; $X_{2k,3}$ represents a data symbol to which third-layer data is mapped on the $2k^{th}$ subcarrier, and corresponds to a data symbol $d(2k+2)$ of the first data; $X_{2k+1,3}$ represents a data symbol to which the third-layer data is mapped on the $2k+1^{th}$ subcarrier, and corresponds to a data symbol $d(2k+3)$ of the first data; $X_{2k,4}$ represents a data symbol to which fourth-layer data is mapped on the $2k^{th}$ subcarrier, and corresponds to a data symbol $-(d(2k+3))^*$ of the first data; $X_{2k+1,4}$ represents a data symbol to which the second-layer data is mapped on the $2k+1^{th}$ subcarrier, and corresponds to a data symbol $(d(2k+2))^*$ of the first data; and data symbols of the second data are represented as X:

$$X = \begin{bmatrix} X_{2k,1} & X_{2k+1,1} \\ X_{2k,2} & X_{2k+1,2} \\ X_{2k,3} & X_{2k+1,3} \\ X_{2k,4} & X_{2k+1,4} \end{bmatrix}$$

where in the matrix X, the first column represents the $2k^{th}$ subcarrier, the second column represents the $2k+1^{th}$ subcarrier, the first row represents the first-layer data, the second row represents the second-layer data, the third row represents the third-layer data, and the fourth row represents the fourth-layer data.

If $d(2k)$ and $d(2k+2)$ are same data, and $d(2k+1)$ and $d(2k+3)$ are same data, repeated data exists in the second data, helping to improve data transmission reliability. If $d(2k)$ and $d(2k+2)$ are different data, and $d(2k+1)$ and $d(2k+3)$ are different data, no repeated data exists in the second data, helping to improve data transmission efficiency.

The first network device performs precoding processing on the second data based on the determined precoding matrix, to obtain third data, in other words, performs precoding processing on each layer of complex modulation data symbols, to obtain the third data. The precoding scheme is $Y=WX$, where W is the determined precoding matrix, X is the data symbol of the second data, and Y is a data symbol of the third data. Precoding processing is performed on each layer of data. A quantity of rows of the precoding matrix is a quantity of antenna ports, and a quantity of columns is a rank.

After performing precoding processing, the first network device performs resource block mapping and OFDM signal generation processing on the third data, and sends the third data. Resource block mapping processing is performed by a resource element mapper in FIG. 3, and OFDM signal generation processing is performed by an OFDM signal generator in FIG. 3. The resource element mapper maps each layer of complex modulation data symbols on which precoding is performed to a resource element (k,l) in a physical resource block. The OFDM signal generator modulates, into time-domain OFDM data symbols, each layer of complex modulation data symbols processed by the resource element mapper. The first network device sends, by using antenna ports in FIG. 3, the data symbols processed by the OFDM signal generator. The first network device may send the processed data to the second network device, or may send the processed data to another network device. The second network device performs OFDM demodulation on the data when receiving the data that is sent by the first network device by using the antenna ports.

In this embodiment of the present disclosure, the second network device measures the channel state information based on the pilot signal, and sends the rank index information and the precoding matrix index information to the first network device based on the channel state information. The first network device receives the rank index information and the precoding matrix index information that are sent by the second network device based on the channel state information, determines the diversity coding scheme based on the rank index information, determines the precoding matrix based on the precoding matrix index information, and performs transmission processing on the to-be-transmitted data based on the determined diversity coding scheme and precoding matrix. Therefore, diversity coding similar to space frequency block coding is combined with precoding, so that an antenna gain is increased, further a space loss is reduced, and the data transmission reliability is improved.

Figure 4:
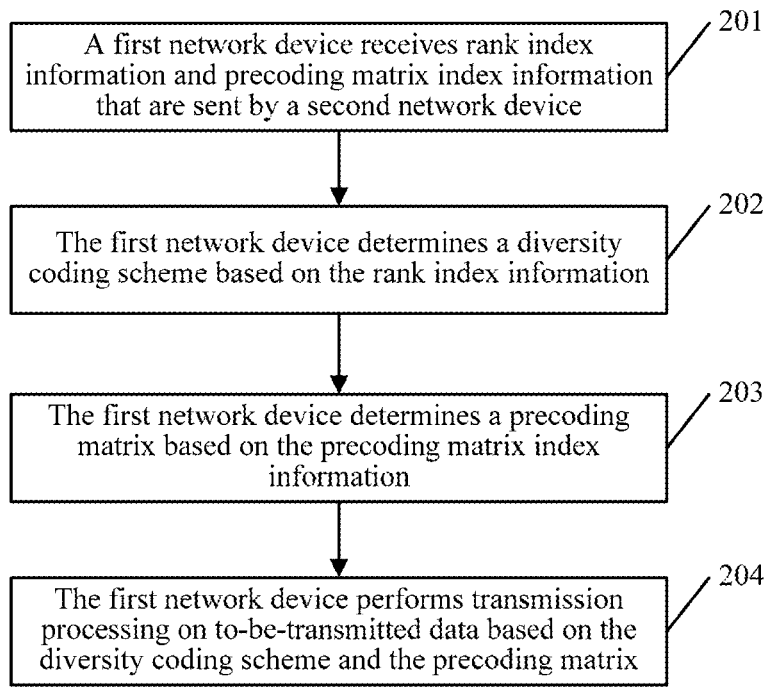
FIG. 4 is a schematic flowchart of a transmit diversity method according to Embodiment 2 of the present disclosure.

Referring to FIG. 4, FIG. 4 is a schematic flowchart of a transmit diversity method according to Embodiment 2 of the present disclosure. As shown in FIG. 4, the method provided in Embodiment 2 of the present disclosure may include content of elements 201 to 204.

201. A first network device receives rank index information and precoding matrix index information that are sent by a second network device.

Specifically, before the first network device receives the rank index information and the precoding matrix index information that are sent by the second network device, the first network device sends a pilot signal to the second network device by using an air interface between the first network device and the second network device, so that the second network device measures channel state information based on the pilot signal, and sends the rank index information and the precoding matrix index information to the first network device. There are a plurality of second network devices in coverage of a base station of the first network device, and the first network device may send different pilot signals to the plurality of network devices.

The first network device receives, by using the air interface between the second network device and the first network device, the rank index information and the precoding matrix index information that are sent by the second network device based on the channel state information.

202. The first network device determines a diversity coding scheme based on the rank index information.

Specifically, because orthogonality between data paths on different MIMO channels is different, interference between data streams needs to be considered in an actual application. When a plurality of code words are transmitted by using a plurality of antennas, a quantity of data streams, in other words, a quantity of layers, that can be sent at the same time needs to be determined based on a rank of a space channel, to reduce interference between information, improve receiving accuracy, and increase an information transmission capacity. The first network device determines whether the received rank index information is the first preset rank 2 or the second preset rank 4, and determines the diversity coding scheme based on a determining result. Referring to FIG. 3, the diversity coding scheme is similar to SFBC coding shown in FIG. 1. However, the SFBC coding in FIG. 1 is coding of only two layers of data, while diversity coding in this embodiment of the present disclosure is applied to coding of two layers of data or coding of four layers of data. The diversity coding scheme is two space frequency block coding matrices in FIG. 3. Data symbols in the first row of the first matrix are $x_{2k}$ and $x_{2k+1}$, and data symbols in the first row of the second matrix are 2k+2 and $x_{2k+3}$, $x_{2k}$ and $x_{2k+2}$ may represent data symbols of same data, or may represent different data symbols of different data. $x_{2k+1}$ and $x_{2k+3}$ may represent data symbols of same data, or may represent different data symbols of different data. There is a switch between modulation and the space frequency block coding matrices. When the rank index information is the first preset rank 2, the first network device controls the switch to be disconnected, so that a quantity of layers of data flowing into the space frequency block coding matrices is two. When the rank index information is the second preset rank 4, the first network device controls the switch to be connected, so that a quantity of layers of data flowing into the space frequency block coding matrices is four. It may be understood that the first network device controls, based on the rank index information, the switch to be disconnected or connected, to further determine the diversity coding scheme.

Optionally, if the rank index information is the first preset rank 2, the first network device determines the diversity coding scheme as a first diversity coding scheme, and the first diversity coding scheme is a diversity coding scheme for two layers of data.

Optionally, if the rank index information is the second preset rank 4, the first network device determines the transmit diversity manner as a second diversity coding scheme, and the second diversity coding scheme is a diversity coding scheme for four layers of data.

203. The first network device determines a precoding matrix based on the precoding matrix index information.

Specifically, the first network device determines the precoding matrix based on the precoding matrix index information sent by the second network device, in other words, determines the precoding matrix used for precoding in FIG. 3. Precoding may be classified into linear precoding and non-linear precoding. For linear precoding, a side receiving channel state information can perform decoding only by using some linear detection means. The linear detection means mainly include linear zero forcing (including a beamforming method and the like), channel inversion, and the like. Design of non-linear precoding is complex. Common non-linear precoding is dirty-paper coding, and generally, N relevant non-linear equations need to be processed. Because non-linear precoding has high complexity and a decoding algorithm is complex, a linear precoding technology is used in LTE, and the linear precoding technology is also used in this embodiment of the present disclosure. A linear precoding operation may be expressed as:

$$Y=WX$$

where W is a precoding matrix, X is transmitted data, in other words, data input for precoding, and Y is a new transmit vector obtained after precoding processing is performed on transmission information, in other words, data output after precoding.

The linear precoding operation may be classified into two categories of precoding schemes based on locations of obtaining precoding matrices thereof: a non-codebook-based precoding operation and a codebook-based precoding operation.

In the non-codebook-based precoding scheme, a precoding matrix is obtained on a base station side. The base station side calculates a precoding matrix by using predicted channel state information (CSI). A common precoding matrix calculation method includes singular value decomposition, uniform channel decomposition, and the like. In the non-codebook-based precoding scheme, a dedicated pilot needs to be used. In other words, a data symbol and a pilot symbol are used together for a precoding operation. In this way, a user side can obtain, only through channel estimation, an equivalent channel after precoding, facilitating data demodulation.

In the codebook-based precoding scheme, a precoding matrix is obtained on a user side. The second network device selects a precoding matrix from a predetermined precoding codebook by using measured channel state information, and sends a sequence number (PMI) of the selected precoding matrix to a base station. The precoding matrix codebook is constructed in a plurality of manners, for example, a codebook based on antenna selection, a codebook based on an adaptive array transmit mode, a codebook based on discrete Fourier transform, or a random codebook. The precoding matrix may be selected from the predetermined precoding matrix codebook based on performance indicator-based selection and quantization-based selection.

In this embodiment of the present disclosure, the first network device selects the precoding matrix from the preset precoding codebook based on the precoding index information, to determine the precoding matrix.

204. The first network device performs transmission processing on to-be-transmitted data based on the diversity coding scheme and the precoding matrix.

Specifically, after the diversity coding scheme and the precoding matrix are determined, the first network device performs transmission processing on the to-be-transmitted data based on the determined diversity coding scheme and precoding matrix. The first network device performs coding, scrambling, and modulation processing on the to-be-transmitted data, to obtain first data. Data symbols of the to-be-transmitted data are represented as $a(0), \ldots, a(M_{symb}-1)$ in other words, code words in FIG. 3. The code words are coded, and then, scrambling and modulation processing in FIG. 3 are performed on the code words, to obtain the first data. Data symbols of the first data are represented as $d(0), \ldots, d(M_{symb}-1)$, and $M_{symb}$ represents a quantity of data symbols of the to-be-transmitted data. There may be one or two code words. If there is one code word, $M_{symb}$ is a quantity of data symbols of the code word, to be specific, a quantity of the code words included in the to-be-transmitted data. If there are two code words, $M_{symb}$ is a sum of quantities of data symbols of the two code words, and includes a quantity $M_{symb}^{(0)}$ of data symbols of the first code word and a quantity $M_{symb}^{(1)}$ of data symbols of the second code word. Data symbols of the first code word are represented as $d^{(0)}(i), i=0, 1, \ldots, M_{symb}^{(0)}$, and data symbols of the second code word are represented as $d^{(1)}(i), i=0, 1, \ldots, M_{symb}^{(1)}$. A specific coding scheme and a specific scrambling manner are not limited in this embodiment of the present disclosure. For different downlink channels, modulation schemes are different. For example, for a physical downlink shared channel (PDSCH), a modulation scheme is quadrature phase shift keying (QPSK), 16 quadrature amplitude modulation (QAM), or 64 QAM. Each code word of the to-be-transmitted data is coded, and the coded data is scrambled, so that the data is transmitted on one physical channel. The scrambled data is modulated, to generate complex modulation data symbols.

The first network device processes the first data based on the determined diversity coding scheme, to obtain second data. During diversity coding, the complex modulation data symbols are mapped to one or more transport layers. If the diversity coding scheme is determined as the first diversity coding scheme, the first network device processes $d(2k)$, $2k=0, 1, \ldots, M_{symb}-1$ by using the first diversity coding scheme, to obtain the second data.

The first diversity coding scheme is:

$$X_{2k,1}=d(2k)\ X_{2k,2}=d(2k+1)$$

$$X_{2k+1,1}=-(d(2k+1))^*\ X_{2k+1,2}=(d(2k))^*$$

where $X_{2k,1}$ represents a data symbol to which first-layer data is mapped on a $2k^{th}$ subcarrier, and corresponds to a data symbol $d(2k)$ of the first data; $X_{2k+1,1}$ represents a data symbol to which the first-layer data is mapped on a $2k+1^{th}$ subcarrier, and corresponds to a data symbol $-(d(2k+1))^*$ of the first data; $X_{2k,2}$ represents a data symbol to which second-layer data is mapped on the $2k^{th}$ subcarrier, and corresponds to a data symbol $d(2k+1)$ of the first data; $X_{2k+1,2}$ represents a data symbol to which the second-layer data is mapped on the $2k+1^{th}$ subcarrier, and corresponds to a data symbol $(d(2k))^*$ of the first data; and data symbols of the second data are represented as X:

$$X = \begin{bmatrix} X_{2k,1} & X_{2k,2} \\ X_{2k+1,1} & X_{2k+1,2} \end{bmatrix}$$

where in the matrix X, the first row represents the $2k^{th}$ subcarrier, the second row represents the $2k+1^{th}$ subcarrier, the first column represents the first-layer data, and the second column represents the second-layer data.

Alternatively, the first diversity coding scheme is:

$$X_{2k,1}=d(2k)\ X_{2k+1,1}=d(2k+1)$$

$$X_{2k,2}=-(d(2k+1))^*\ X_{2k+1,2}=(d(2k))^*$$

where $X_{2k,1}$ represents a data symbol to which first-layer data is mapped on a $2k^{th}$ subcarrier, and corresponds to a data symbol $d(2k)$ of the first data; $X_{2k+1,1}$ represents a data symbol to which the first-layer data is mapped on a $2k+1^{th}$ subcarrier, and corresponds to a data symbol $d(2k+1)$ of the first data; $X_{2k,2}$ represents a data symbol to which second-layer data is mapped on the $2k^{th}$ subcarrier, and corresponds to a data symbol $-(d(2k+1))^*$ of the first data; $X_{2k+1,2}$ represents a data symbol to which the second-layer data is mapped on the $2k+1^{th}$ subcarrier, and corresponds to a data symbol $(d(2k))^*$ of the first data; and data symbols of the second data are represented as X:

$$X = \begin{bmatrix} X_{2k,1} & X_{2k+1,1} \\ X_{2k,2} & X_{2k+1,2} \end{bmatrix}$$

where in the matrix X, the first column represents the $2k^{th}$ subcarrier, the second column represents the $2k+1^{th}$ subcarrier, the first row represents the first-layer data, and the second row represents the second-layer data.

Optionally, the first diversity coding scheme is:

$$X_{2k,1}=d(2k+1)\ X_{2k,2}=d(2k)$$

$$X_{2k+1,1}=-(d(2k+1))^*\ X_{2k+1,2}=(d(2k+1))^*$$

where $X_{2k,1}$ represents a data symbol to which first-layer data is mapped on a $2k^{th}$ subcarrier, and corresponds to a data symbol $d(2k+1)$ of the first data; $X_{2k+1,1}$ represents a data symbol to which the first-layer data is mapped on a $2k+1^{th}$ subcarrier, and corresponds to a data symbol $-(d$ (2k))* of the first data; $X_{2k,2}$ represents a data symbol to which second-layer data is mapped on the $2k^{th}$ subcarrier, and corresponds to a data symbol d(2k) of the first data; $X_{2k+1,2}$ represents a data symbol to which the second-layer data is mapped on the $2k+1^{th}$ subcarrier, and corresponds to a data symbol $(d(2k+1))^*$ of the first data; and data symbols of the second data are represented as X:

$$X = \begin{bmatrix} X_{2k,1} & X_{2k,2} \\ X_{2k+1,1} & X_{2k+1,2} \end{bmatrix}$$

where in the matrix X, the first row represents the $2k^{th}$ subcarrier, the second row represents the $2k+1^{th}$ subcarrier, the first column represents the first-layer data, and the second column represents the second-layer data.

Alternatively, the first diversity coding scheme is:

$X_{2k,1}=d(2k+1)$ $X_{2k+1,2}=d(2k)$ $X_{2k,2}=-(d(2k))^*$ $X_{2k+1,2}=(d(2k+1))^*$ where $X_{2k,1}$ represents a data symbol to which first-layer data is mapped on a $2k^{th}$ subcarrier, and corresponds to a data symbol d(2k+1) of the first data; $X_{2k+1,1}$ represents a data symbol to which the first-layer data is mapped on a $2k+1^{th}$ subcarrier, and corresponds to a data symbol d(2k) of the first data; $X_{2k,2}$ represents a data symbol to which second-layer data is mapped on the $2k^{th}$ subcarrier, and corresponds to a data symbol $-(d(2k))^*$ of the first data; $X_{2k+1,2}$ represents a data symbol to which the second-layer data is mapped on the $2k+1^{th}$ subcarrier, and corresponds to a data symbol $(d(2k+1))^*$ of the first data; and data symbols of the second data are represented as X:

$$X = \begin{bmatrix} X_{2k,1} & X_{2k+1,1} \\ X_{2k,2} & X_{2k+1,2} \end{bmatrix}$$

where in the matrix X, the first column represents the $2k^{th}$ subcarrier, the second column represents the $2k+1^{th}$ subcarrier, the first row represents the first-layer data, and the second row represents the second-layer data.

If the diversity coding scheme is determined as the second diversity coding scheme, the first network device processes d(2k), 2k=0, 1, . . . , $M_{symb}$−1 by using the second diversity coding scheme, to obtain the second data.

The second diversity coding scheme is as follows:

$X_{2k,1}=d(2k)$ $X_{2k+1,1}=d(2k+1)$ $X_{2k,2}=-(d(2k+1))^*$ $X_{2k+1,2}=(d(2k))^*$ $X_{2k,3}=d(2k+2)$ $X_{2k+1,3}=d(2k+3)$ $X_{2k,4}=-(d(2k+3))^*$ $X_{2k+1,4}=(d(2k+2))^*$ where $X_{2k,1}$ represents a data symbol to which first-layer data is mapped on a $2k^{th}$ subcarrier, and corresponds to a data symbol d(2k) of the first data; $X_{2k+1,2}$ represents a data symbol to which the first-layer data is mapped on a $2k+1^{th}$ subcarrier, and corresponds to a data symbol d(2k+1) of the first data; $X_{2k,2}$ represents a data symbol to which second-layer data is mapped on the $2k^{th}$ subcarrier, and corresponds to a data symbol $-(d(2k+1))^*$ of the first data; $X_{2k+1,2}$ represents a data symbol to which the second-layer data is mapped on the $2k+1^{th}$ subcarrier, and corresponds to a data symbol $(d(2k))^*$ of the first data; $X_{2k,3}$ represents a data symbol to which third-layer data is mapped on the $2k^{th}$ subcarrier, and corresponds to a data symbol d(2k+2) of the first data; $X_{2k+1,3}$ represents a data symbol to which the third-layer data is mapped on the $2k+1^{th}$ subcarrier, and corresponds to a data symbol d(2k+3) of the first data; $X_{2k,4}$ represents a data symbol to which fourth-layer data is mapped on the $2k^{th}$ subcarrier, and corresponds to a data symbol $-(d(2k+3))^*$ of the first data; $X_{2k+1,4}$ represents a data symbol to which the second-layer data is mapped on the $2k+1^{th}$ subcarrier, and corresponds to a data symbol $(d(2k+2))^*$ of the first data; and data symbols of the second data are represented as X:

$$X = \begin{bmatrix} X_{2k,1} & X_{2k+1,1} \\ X_{2k,2} & X_{2k+1,2} \\ X_{2k,3} & X_{2k+1,3} \\ X_{2k,4} & X_{2k+1,4} \end{bmatrix}$$

where in the matrix X, the first column represents the $2k^{th}$ subcarrier, the second column represents the $2k+1^{th}$ subcarrier, the first row represents the first-layer data, the second row represents the second-layer data, the third row represents the third-layer data, and the fourth row represents the fourth-layer data.

If d(2k) and d(2k+2) are same data, and d(2k+1) and d(2k+3) are same data, repeated data exists in the second data, helping to improve data transmission reliability. If d(2k) and d(2k+2) are different data, and d(2k+1) and d(2k+3) are different data, no repeated data exists in the second data, helping to improve data transmission efficiency.

The first network device performs precoding processing on the second data based on the determined precoding matrix, to obtain third data, in other words, performs precoding processing on each layer of complex modulation data symbols, to obtain the third data. The precoding scheme is Y=WX, where W is the determined precoding matrix, X is the data symbol of the second data, and Y is a data symbol of the third data. Precoding processing is performed on each layer of data. A quantity of rows of the precoding matrix is a quantity of antenna ports, and a quantity of columns is a rank.

After performing precoding processing, the first network device performs resource block mapping and OFDM signal generation processing on the third data, and sends the third data. Resource block mapping processing is performed by a resource element mapper in FIG. 3, and OFDM signal generation processing is performed by an OFDM signal generator in FIG. 3. The resource element mapper maps each layer of complex modulation data symbols on which precoding is performed to a resource element (k,l) in a physical resource block. The OFDM signal generator modulates, into time-domain OFDM data symbols, each layer of complex modulation data symbols processed by the resource element mapper. The first network device sends, by using antenna ports in FIG. 3, the data symbols processed by the OFDM signal generator. The first network device may send the processed data to the second network device, or may send the processed data to another network device. The second network device performs OFDM demodulation on the data when receiving the data that is sent by the first network device by using the antenna ports.

Figure 5:
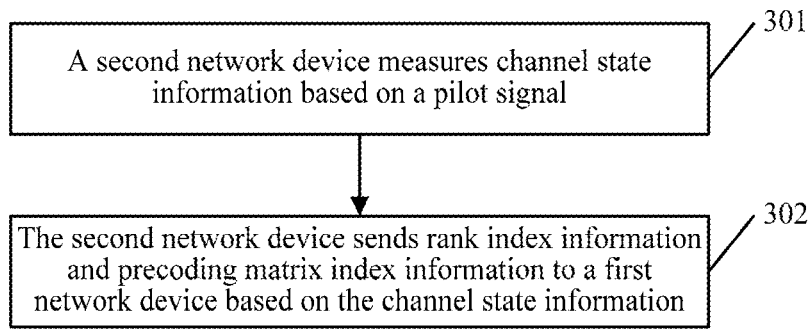
FIG. 5 is a schematic flowchart of a transmit diversity method according to Embodiment 3 of the present disclosure.

In this embodiment of the present disclosure, the first network receives the rank index information and the precoding matrix index information that are sent by the second network device, determines the diversity coding scheme based on the rank index information, determines the precoding matrix based on the precoding matrix index information, and performs transmission processing on the to-be-transmitted data based on the determined diversity coding scheme and precoding matrix. Therefore, the first network device combines diversity coding similar to space frequency block coding with precoding, so that not only an SFBC diversity gain can be obtained, but also a precoding gain can be obtained, thereby increasing an antenna gain, further, reducing a space loss, and improving the data transmission reliability Referring to FIG. 5, FIG. 5 is a schematic flowchart of a transmit diversity method according to Embodiment 3 of the present disclosure. As shown in FIG. 5, the method provided in Embodiment 3 of the present disclosure may include content of elements 301 and 302.

301. A second network device measures channel state information based on a pilot signal.

Specifically, the second network device receives, by using an air interface between a first network device and the second network device, the pilot signal sent by the first network device, and measures the channel state information based on the pilot signal when receiving the pilot signal.

302. The second network device sends rank index information and precoding matrix index information to a first network device based on the channel state information.

Specifically, the second network device extracts the rank index information and the precoding matrix index information in the measured channel state information, and sends the rank index information and the precoding matrix index information to the first network device by using the air interface between the second network device and the first network device. The second network device may perform sending to the first network device periodically or non-periodically. This depends on a specific case, and a specific sending period is not limited herein. Currently, the second network device sends all measured channel state information to the first network device, and in this embodiment of the present disclosure, the second network device needs to send only the rank index information and the precoding matrix index information in the channel state information. In addition, the rank index information is in this embodiment of the present disclosure is a first preset rank 2 or a second preset rank 4. However, current rank index information not only may be the first preset rank 2 or the second preset rank 4, but also may be another rank, and as a result, a plurality of ranks need to be traversed before a rank to be sent to the first network device is determined. In this embodiment of the present disclosure, there are only two ranks, thereby reducing an operation time to some extent.

Optionally, the second network device selects a precoding matrix from a preset precoding codebook based on the channel state information, and the second network device determines the precoding matrix index information based on the precoding matrix, and sends the precoding matrix index information to the first network device. The preset precoding codebook is stored in each of the second network device and the first network device. The second network device determines the precoding matrix index information based on the preset precoding codebook, and the first network device determines, based on the preset precoding codebook, a precoding codebook corresponding to the precoding matrix index information.

The first network device determines a diversity coding scheme based on the rank index information sent by the second network device, determines the precoding matrix based on the precoding matrix index information, and further performs transmission processing on to-be-transmitted data based on the determined diversity coding scheme and precoding matrix. For a specific processing process, refer to FIG. 3.

The second network device may receive the processed data sent by the first network device. Because OFDM modulation is performed on the data on which transmission processing is performed, the second network device performs OFDM demodulation processing on the processed data when receiving the processed data sent by the first network device.

In this embodiment of the present disclosure, the second network device receives the pilot signal sent by the first network device, measures the channel state information based on the pilot signal, and sends the rank index information and the precoding matrix index information to the first network device based on the channel state information, so that the first network device determines the diversity coding scheme and the precoding matrix, and the first network device combines space frequency block coding with precoding.

Figure 6:
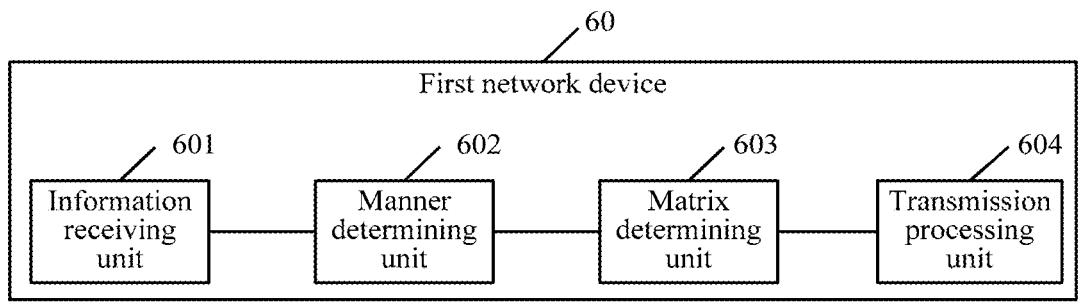
FIG. 6 is a schematic structural diagram of a first network device according to an embodiment of the present disclosure.

Referring to FIG. 6, FIG. 6 is a schematic structural diagram of a first network device according to an embodiment of the present disclosure. The first network device 60 includes an information receiving unit 601, a manner determining unit 602, a matrix determining unit 603, and a transmission processing unit 604.

The information receiving unit 601 is configured to receive rank index information and precoding matrix index information that are sent by a second network device.

The manner determining unit 602 is configured to determine a diversity coding scheme based on the rank index information.

The matrix determining unit 603 is configured to determine a precoding matrix based on the precoding matrix index information.

The data processing unit 604 is configured to perform transmission processing on to-be-transmitted data based on the diversity coding scheme and the precoding matrix.

The first network device shown in FIG. 6 is configured to implement the embodiment shown in FIG. 4. A basic idea and a beneficial effect of the first network device are the same as those of FIG. 4, and details are not described herein again.

Figure 7:
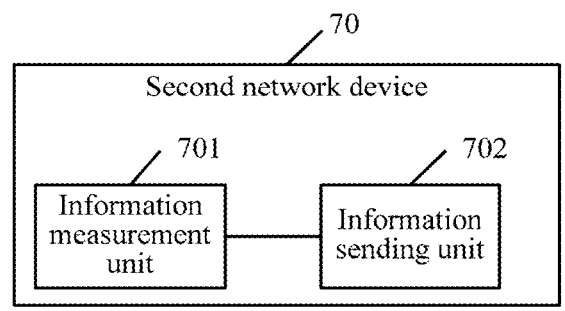
FIG. 7 is a schematic structural diagram of a second network device according to an embodiment of the present disclosure.

Referring to FIG. 7, FIG. 7 is a schematic structural diagram of a second network device according to an embodiment of the present disclosure. The second network device 70 includes an information measurement unit 701 and an information sending unit 702.

The information measurement unit 701 is configured to measure channel state information based on a pilot signal.

The information sending unit 702 is configured to send rank index information and precoding matrix index information to a first network device based on the channel state information, so that the first network device determines a diversity coding scheme based on the rank index information, determines a precoding matrix based on the precoding matrix index information, and performs transmission processing on to-be-transmitted data based on the diversity coding scheme and the precoding matrix.

The first network device shown in FIG. 7 is configured to implement the embodiment shown in FIG. 5. A basic idea and a beneficial effect of the first network device are the same as those of FIG. 5, and details are not described herein again.

The first network device shown in FIG. 6 and the second network device shown in FIG. 7 are combined, to implement the embodiment shown in FIG. 2.

Figure 8:
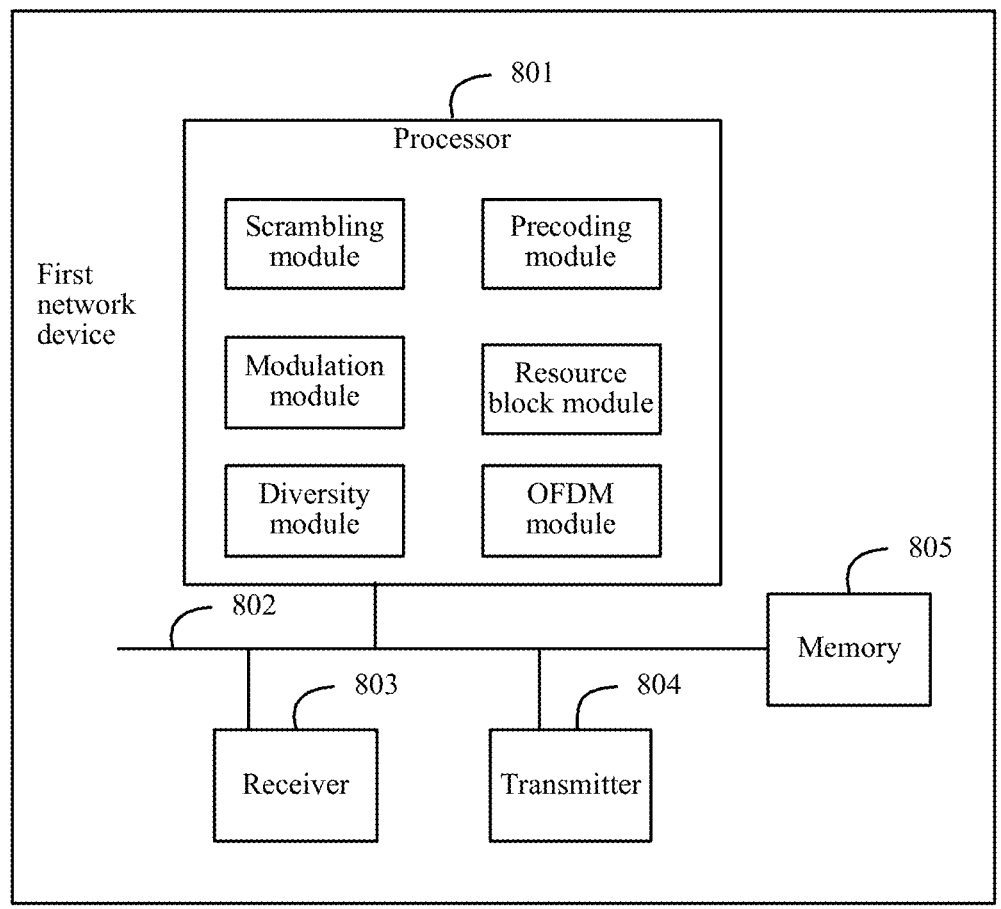
FIG. 8 is a schematic structural diagram of another first network device according to an embodiment of the present disclosure.

Referring to FIG. 8, FIG. 8 is a schematic structural diagram of another first network device according to an embodiment of the present disclosure. As shown in FIG. 8, the first network device includes at least one processor 801, at least one communications bus 802, a receiver 803, a transmitter 804, and a memory 805. The communications bus 802 is configured to implement connection and communication between the components. The receiver 803 and the transmitter 804 are collectively referred to as a transceiver station. The transceiver station implements, under the control of the processor 801, control of a base station and switching between radio channels, to implement transmission and reception of a communication signal of user equipment, wireless transmission performed between mobile stations through an air interface, and a related control function. The processor 801 is responsible for management of all mobile communications interface, and is mainly responsible for radio channel allocation, release, and management. The processor 801 invokes program code stored in the memory 805, to perform a corresponding operation and implement a corresponding function.

The processor 801 in this embodiment of the present disclosure is configured to control data transmission. As shown in FIG. 8, the processor 801 includes a scrambling module, a modulation module, a diversity module, a precoding module, a resource block module, and an OFDM module, respectively corresponding to scrambling, modulation, two matrices, precoding, a resource element mapper, and an OFDM signal generator in FIG. 3. The processor 801 is configured to implement the manner determining unit, the matrix determining unit, and the data processing unit in the embodiment shown in FIG. 6. For a specific implementation process, refer to specific descriptions of the embodiment shown in FIG. 4, and details are not described herein again.

The receiver 803 is configured to: implement the information receiving unit in the embodiment shown in FIG. 6, and receive rank index information and precoding matrix index information that are sent by a second network device. The transmitter is configured to transmit data processed by the processor 801 to user equipment in coverage of the first network device by using an antenna port, where the user equipment includes the second network device. The antenna port of the first network device is not marked in FIG. 8.

Figure 9:
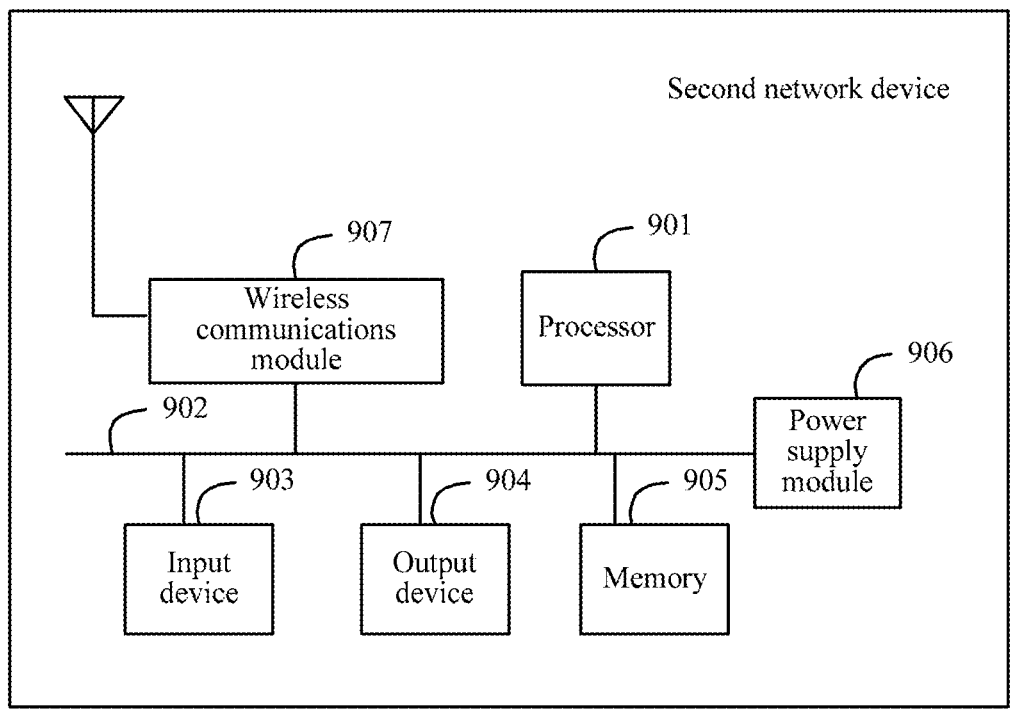
FIG. 9 is a schematic structural diagram of another second network device according to an embodiment of the present disclosure.

Referring to FIG. 9, FIG. 9 is a schematic structural diagram of another second network device according to an embodiment of the present disclosure. As shown in FIG. 9, the second network device includes at least one processor 901 such as a CPU, at least one communications bus 902, an input device 903, an output device 904, a memory 905, a power supply module 906, and a wireless communications module 907. The communications bus 902 is configured to implement connection and communication between the components. The input device 903 is configured to receive an audio or video signal, and is further configured to: receive an input command of a user, and generate key input data based on the input command, to control various operations of the second network device. The output device 904 is constructed to provide an output signal (for example, an audio signal, a video signal, an alarm signal, or a vibration signal) in a visual, audio, and/or tactile manner. The output device 904 may include a display unit, an audio output module, an alarm unit, and the like, and these are not marked in FIG. 9. The power module 906 receives, under the control of the processor 901, external power or internal power, and supply needed power to a device, a module, the memory 905, the processor 901, and the like on the communications bus 902.

The memory 905 may include at least one type of storage medium. The storage medium includes a flash memory, a hard disk, a multimedia card, a card memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. The processor 901 usually controls an overall operation of the second network device. For example, the processor 901 performs controlling and processing related to a voice call, data communication, a video call, and the like.

The processor 901 is configured to: implement the information measurement unit in the embodiment shown in FIG. 7, and measure channel state information based on a pilot signal.

The wireless communications module 907 is configured to send a radio signal to at least one of a base station (for example, an access point, a NodeB, and the like), an external terminal, and a server, and/or an apparatus receiving a radio signal from the wireless communications module. The radio signal may be a voice call signal, a video call signal, or various types of data sent and/or received based on a text and/or multimedia message.

The wireless communications unit 907 is configured to: implement the information sending unit in the embodiment shown in FIG. 7, send rank index information and precoding matrix index information to a first network device, so that the first network device determines a diversity coding scheme based on the rank index information, determines a precoding matrix based on the precoding matrix index information, and performs transmission processing on to-be-transmitted data based on the diversity coding scheme and the precoding matrix. The wireless communications module 907 further includes an air interface, and this is not marked in FIG. 9. The air interface is configured to perform communication between the second network device and another user equipment or the first network device.

An embodiment of the present disclosure further provides a transmit diversity system, including the first network device shown in FIG. 6 and the second network device shown in FIG. 7, or including the first network device shown in FIG. 8 and the second network device shown in FIG. 9.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also appreciate that all the embodiments described in the specification are example embodiments, and the related actions and modules are not necessarily mandatory to the present disclosure.

In the foregoing embodiments, the description of each embodiment has respective focuses. For a part that is not described in detail in an embodiment, reference may be made to related descriptions in other embodiments.

A sequence of the steps of the method in the embodiments of the present disclosure may be adjusted, and certain steps may also be merged or removed according to an actual need.

The units in the apparatus in the embodiments of the present disclosure may be combined, divided, and deleted according to an actual requirement. A person skilled in the art may combine different embodiments or features of different embodiments described in this specification.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is taken as an example but is not limited: The computer readable medium may include a random access memory (RAM), a read-only memory (ROM), an electrically erasable programmable read-only memory (EEPROM), a compact disc read-only memory (CD-ROM) or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line ( ) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present disclosure includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A transmit diversity method, comprising:
   receiving, by a first network device, rank index information and precoding matrix index information that are sent by a second network device;
   determining, by the first network device, a diversity coding scheme based on the rank index information, wherein determining, by the first network device, the diversity coding scheme based on the rank index information comprises:
   when the rank index information is a first preset rank 2, determining, by the first network device, the diversity coding scheme as a first diversity coding scheme, wherein the first diversity coding scheme is:

$$X_{2k,1}=d(2k) \ X_{2k,2}=d(2k+1)$$

$$X_{2k+1,1}=-(d(2k+1))^* \ X_{2k+1,2}=(d(2k))^*$$

wherein $X_{2k,1}$ represents a data symbol to which first-layer data is mapped on a $2k^{th}$ subcarrier, and corresponds to a data symbol $d(2k)$ of the first data; $X_{2k+1,1}$ represents a data symbol to which the first-layer data is mapped on a $2k+1^{th}$ subcarrier, and corresponds to a data symbol $-(d(2k+1))^*$ of the first data; $X_{2k,2}$ represents a data symbol to which second-layer data is mapped on the $2k^{th}$ subcarrier, and corresponds to a data symbol $d(2k+1)$ of the first data; $X_{2k+1,2}$ represents a data symbol to which the second-layer data is mapped on the $2k+1^{th}$ subcarrier, and corresponds to a data symbol $(d(2k))^*$ of the first of the first data; and data symbols of the second data are represented as X; or $$X_{2k,1}=d(2k) \ X_{2k+1,1}=d(2k+1)$$

$$X_{2k,2}=-(d(2k+1))^* \ X_{2k+1,2}=(d(2k))^*$$

wherein $X_{2k,1}$ represents a data symbol to which first-layer data is mapped on a $2k^{th}$ subcarrier, and corresponds to a data symbol $d(2k)$ of the first data; $X_{2k+1,1}$ represents a data symbol to which the first-layer data is mapped on a $2k+1^{th}$ subcarrier, and corresponds to a data symbol $d(2k+1)$ of the first data; $X_{2k,2}$ represents a data symbol to which second-layer data is mapped on the $2k^{th}$ subcarrier, and corresponds to a data symbol $-(d(2k+1))^*$ of the first data; $X_{2k+1,2}$ represents a data symbol to which the second-layer data is mapped on the $2k +1$ subcarrier, and corresponds to a data symbol $(d(2k))^*$ of the first data; and data symbols of the second data are represented as X, and
   when the rank index information is a second preset rank 4, determining, by the first network device, the diversity coding scheme as a second diversity coding scheme;
   determining, by the first network device, a precoding matrix based on the precoding matrix index information; and
   performing, by the first network device, transmission processing on to-be-transmitted data based on the diversity coding scheme and the precoding matrix, wherein performing, by the first network device, the transmission processing on the to-be-transmitted data based on the diversity coding scheme and the precoding matrix comprises:
   performing, by the first network device, coding, scrambling, and modulation processing on the to-be-transmitted data, to obtain the first data,
   processing, by the first network device, the first data based on the diversity coding scheme, to obtain second data,
   performing, by the first network device, precoding processing on the second data based on the precoding matrix, to obtain third data,
   performing, by the first network device, resource block mapping and orthogonal frequency division multiplexing (OFDM) signal generation processing on the third data, and
   sending, by the first network device, the third data.

2. The method according to claim 1, wherein processing, by the first network device, the first data based on the diversity coding scheme, to obtain second data comprises:
   when the diversity coding scheme is the second diversity coding scheme, processing, by the first network device, the first data by using the second diversity coding scheme, to obtain the second data, wherein data symbols of the first data are are $d(2k)$, $2k=0, 1, \ldots, M_{symb}-1$, and $M_{symb}$ represents a quantity of data symbols of the to-be-transmitted data, wherein the second diversity coding scheme is:

$$X_{2k,1}=d(2k) \quad X_{2k+1,1}=d(2k+1)$$

$$X_{2k,2}=-(d(2k+1))^* \quad X_{2k+1,2}=(d(2k))^*$$

$$X_{2k,3}=d(2k+2) \quad X_{2k+1,3}=d(2k+3)$$

$$X_{2k,4}=-(d(2k+3))^* \quad X_{2k+1,4}=(d(2k+2))^*$$

wherein $X_{2k,1}$ represents a data symbol to which first-layer data is mapped on a $2k^{th}$ subcarrier, and corresponds to a data symbol $d(2k)$ of the first data; $X_{2k+1,2}$ represents a data symbol to which the first-layer data is mapped on a $2k+1^{th}$ subcarrier, and corresponds to a data symbol $d(2k+1)$ of the first data; $X_{2k,2}$ represents a data symbol to which second-layer data is mapped on the $2k^{th}$ subcarrier, and corresponds to a data symbol $-(d(2k+1))^*$ of the first data; $X_{2k+1,2}$ represents a data symbol to which the second-layer data is mapped on the $2k+1^{th}$ subcarrier, and corresponds to a data symbol $(d(2k))^*$ of the first data; $X_{2k,3}$ represents a data symbol to which third-layer data is mapped on the $2k^{th}$ subcarrier, and corresponds to a data symbol $d(2k+2)$ of the first data; $X_{2k+1,3}$ represents a data symbol to which the third-layer data is mapped on the $2k+1^{th}$ subcarrier, and corresponds to a data symbol $d(2k+3)$ of the first data; $X_{2k,4}$ represents a data symbol to which fourth-layer data is mapped on the $2k^{th}$ subcarrier, and corresponds to a data symbol $-(d(2k+3))^*$ of the first data; $X_{2k+1,4}$ represents a data symbol to which the fourth-layer data is mapped on the $2k+1^{th}$ subcarrier, and corresponds to a data symbol $(d(2k+2))^*$ of the first data; and data symbols of the second data are represented as X.

3. The method according to claim 2, wherein $d(2k)$ and $d(2k+2)$ are same data, and $d(2k+1)$ and $d(2k+3)$ are same data; or $d(2k)$ and $d(2k+2)$ are different data, and $d(2k+1)$ and $d(2k+3)$ are different data.

4. A first network device, comprising:
a receiver, configured to receive rank index information and precoding matrix index information that are sent by a second network device; and
a processor, configured to:
when the rank index information is a first preset rank 2, determine a diversity coding scheme as a first diversity coding scheme, wherein the first diversity coding scheme is:

$$X_{2k,1}=d(2k) \quad X_{2k,2}=d(2k+1)$$

$$X_{2k+1,1}=-(d(2k+1))^* \quad X_{2k+1,2}=(d(2k))^*$$

wherein $X_{2k,1}$ represents a data symbol to which first-layer data is mapped on a $2k^{th}$ subcarrier, and corresponds to a data symbol $d(2k)$ of the first data; $X_{2k+1,1}$ represents a data symbol to which the first-layer data is mapped on a $2k+1^{th}$ subcarrier, and corresponds to a data symbol $-(d(2k+1))^*$ of the first data; $X_{2k,2}$ represents a data symbol to which second-layer data is mapped on the $2k^{th}$ subcarrier, and corresponds to a data symbol $d(2k+1)$ of the first data; $X_{2k+1,2}$ represents a data symbol to which the second-layer data is mapped on the $2k+1^{th}$ subcarrier, and corresponds to a data symbol $(d(2k))^*$ of the first data; and data symbols of the second data are represented as X; or $$X_{2k,1}=d(2k) \quad X_{2k+1,1}=d(2k+1)$$

$$X_{2k,2}=-(d(2k+1))^* \quad X_{2k+1,2}=(d(2k))^*$$

wherein $X_{2k,1}$ represents a data symbol to which first-layer data is mapped on a $2k^{th}$ subcarrier, and corresponds to a data symbol $d(2k)$ of the first data; $X_{2k+1,1}$ represents a data symbol to which the first-layer data is mapped on a $2k+1^{th}$ subcarrier, and corresponds to a data symbol $d(2k+1)$ of the first data; $X_{2k,2}$ represents a data symbol to which second-layer data is mapped on the $2k^{th}$ subcarrier, and corresponds to a data symbol $-(d(2k+1))^*$ of the first data; $X_{2k+1,2}$ represents a data symbol to which the second-layer data is mapped on the $2k+1^{th}$ subcarrier, and corresponds to a data symbol $(d(2k))^*$ of the first data; and data symbols of the second data are represented as X, when the rank index information is a second preset rank 4, determine the diversity coding scheme as a second diversity coding scheme,
determine a precoding matrix based on the precoding matrix index information,
perform coding, scrambling, and modulation processing on to-be-transmitted data to obtain first data,
process the first data based on the diversity coding scheme to obtain second data,
perform precoding processing on the second data based on the precoding matrix to obtain third data,
perform resource block mapping and orthogonal frequency division multiplexing (OFDM) signal generation processing on the third data, and
send the third data.

5. The first network device according to claim 4, wherein the processor is configured to:
when the diversity coding scheme is the second diversity coding scheme, process the first data by using the second diversity coding scheme, to obtain the second data, wherein data symbols of the first data are $d(2k)$, $2k=0,1, \ldots, M_{symb}-1$, and $M_{symb}$ represents a quantity of data symbols of the to-be-transmitted data, wherein the second diversity coding scheme is:

$$X_{2k,1}=d(2k) \quad X_{2k+1,1}=d(2k+1)$$

$$X_{2k,2}=-(d(2k+1))^* \quad X_{2k+1,2}=(d(2k))^*$$

$$X_{2k,3}=d(2k+2) \quad X_{2k+1,3}=d(2k+3)$$

$$X_{2k,4}=-(d(2k+3))^* \quad X_{2k+1,4}=(d(2k+2))^*$$

wherein $X_{2k,1}$ represents a data symbol to which first-layer data is mapped on a $2k^{th}$ subcarrier, and corresponds to a data symbol $d(2k)$ of the first data; $X_{2k+1,2}$ represents a data symbol to which the first-layer data is mapped on a $2k+1^{th}$ subcarrier, and corresponds to a data symbol $d(2k+1)$ of the first data; $X_{2k,2}$ represents a data symbol to which the second-layer data is mapped on the $2k^{th}$ subcarrier, and corresponds to a data symbol $-(d(2k+1))^*$ of the first data; $X_{2k+1,2}$ represents a data symbol to which third-layer data is mapped on the $2k+1^{th}$ subcarrier, and corresponds to a data symbol $(d(2k))^*$ of the first data; $X_{2k,3}$ represents a data symbol to which the third-layer data is mapped on the $2k^{th}$ subcarrier, and corresponds to a data symbol $d(2k+2)$ of the first data; $X_{2k+1,3}$ represents a data symbol to which the third-layer data is mapped on the $2k+1^{th}$ subcarrier, and corresponds to a data symbol $(d(2k+3))^*$ of the first data; $X_{2k,4}$ represents a data symbol to which the fourth-layer data is mapped on the $2k^{th}$ subcarrier, and corresponds to a data symbol $-(d(2k+3))^*$ of the first data; $X_{2k+1},4$ represents a data symbol to which the fourth-layer data is mapped on the $2k+1^{th}$ subcarrier, and corresponds to a data symbol $(d(2k+2))*$ of the first and data symbols of the second data are represented as X.

6. The first network device according to claim 5, wherein $d(2k)$ and $d(2k+2)$ are same data, and $d(2k+1)$ and $d(2k+3)$ are same data; or $d(2k)$ and $d(2k+2)$ are different data, and $d(2k+1)$ and $d(2k+3)$ are different data.

* * * * *

UNITED STATES PATENT AND TRADEMARK OFFICE
CERTIFICATE OF CORRECTION

PATENT NO. : 10,560,162 B2  
APPLICATION NO. : 16/125276  
DATED : February 11, 2020  
INVENTOR(S) : Kunpeng Liu, Qiang Wu and Leiming Zhang Page 1 of 1

It is certified that error appears in the above-identified patent and that said Letters Patent is hereby corrected as shown below:

In the Claims

In Column 26, Line 3, in Claim 1, delete "the first" and insert -- first --, therefor.

In Column 26, Line 12, in Claim 1, delete "of the first of the first" and insert -- of the first --, therefor.

In Column 26, Line 27, in Claim 1, delete "–(d(2k+1)*" and insert -- –(d(2k+1))* --, therefor.

In Column 26, Line 29, in Claim 1, delete "2k +1" and insert -- $2k+1^{th}$ --, therefor.

In Column 26, Line 66, in Claim 2, delete "are are" and insert -- are --, therefor.

In Column 27, Line 54, in Claim 4, delete "the first" and insert -- first --, therefor.

In Column 28, Line 1, in Claim 4, delete "$X_{2k}$," and insert -- $X_{2k,1}$ --, therefor.

In Column 28, Line 52, in Claim 5, delete "which the" and insert -- which --, therefor.

In Column 28, Line 55, in Claim 5, delete "third" and insert -- the second --, therefor.

In Column 28, Line 58, in Claim 5, delete "which the" and insert -- which --, therefor.

In Column 28, Line 62, in Claim 5, delete "(d(2k+3))*" and insert -- d(2k+3) --, therefor.

In Column 28, Line 63, in Claim 5, delete "which the" and insert -- which --, therefor.

In Column 28, Line 66, in Claim 5, delete "$X_{2k+1},4$" and insert -- $X_{2k+1,4}$ --, therefor.

In Column 29, Lines 1-2, in Claim 5, delete "first and" and insert -- first data; and --, therefor.

Signed and Sealed this  
Nineteenth Day of May, 2020

Andrei Iancu  
*Director of the United States Patent and Trademark Office*